United States Patent
Bunting et al.

[11] Patent Number: 6,134,530
[45] Date of Patent: Oct. 17, 2000

[54] RULE BASED ROUTING SYSTEM AND METHOD FOR A VIRTUAL SALES AND SERVICE CENTER

[75] Inventors: Bryan Bunting; Jim Smith; Jim Walters; Charles McDonough, all of Charlotte, N.C.

[73] Assignee: Andersen Consulting LLP, Chicago, Ill.

[21] Appl. No.: 09/062,335

[22] Filed: Apr. 17, 1998

[51] Int. Cl.[7] .................................................. H04M 7/00
[52] U.S. Cl. .............................. 705/7; 705/9; 379/220; 379/225
[58] Field of Search ........................ 705/7, 9; 370/237; 455/445; 379/34, 220, 225

[56] References Cited

U.S. PATENT DOCUMENTS

| | | | |
|---|---|---|---|
| 4,289,934 | 9/1981 | Pitroda et al. | 379/269 |
| 4,466,098 | 8/1984 | Southard | 714/12 |
| 4,674,036 | 6/1987 | Conforti | 709/400 |
| 4,700,381 | 10/1987 | Eher | 379/279 |
| 4,737,983 | 4/1988 | Frauenthal et al. | 379/221 |
| 4,755,995 | 7/1988 | Anderson et al. | 714/31 |
| 4,866,763 | 9/1989 | Cooper et al. | 379/221 |
| 4,881,261 | 11/1989 | Oliphant et al. | 379/215 |
| 4,951,310 | 8/1990 | Honda et al. | 379/266 |
| 4,988,209 | 1/1991 | Davidson et al. | 370/270 |
| 5,023,868 | 6/1991 | Davidson et al. | 370/221 |
| 5,031,211 | 7/1991 | Nagai et al. | 379/221 |
| 5,036,535 | 7/1991 | Gechter et al. | 379/210 |
| 5,062,103 | 10/1991 | Davidson et al. | 370/270 |
| 5,073,890 | 12/1991 | Danielsen | 370/270 |
| 5,101,451 | 3/1992 | Ash et al. | 379/221 |
| 5,113,430 | 5/1992 | Richardson, Jr. et al. | 379/88 |
| 5,153,909 | 10/1992 | Beckle et al. | 379/265 |
| 5,175,866 | 12/1992 | Childress et al. | 455/8 |
| 5,185,780 | 2/1993 | Leggett | 379/34 |
| 5,193,110 | 3/1993 | Jones et al. | 379/93.14 |
| 5,214,688 | 5/1993 | Szlam et al. | 379/67 |
| 5,247,569 | 9/1993 | Cave | 379/113 |
| 5,271,058 | 12/1993 | Andrews et al. | 379/210 |
| 5,291,492 | 3/1994 | Andrews et al. | 370/259 |
| 5,291,550 | 3/1994 | Levy et al. | 379/242 |
| 5,291,551 | 3/1994 | Conn et al. | 379/265 |
| 5,299,259 | 3/1994 | Otto | 379/221 |
| 5,309,505 | 5/1994 | Szlam et al. | 379/88 |
| 5,309,513 | 5/1994 | Rose | 379/88 |
| 5,317,627 | 5/1994 | Richardson, Jr. et al. | 379/221 |
| 5,325,292 | 6/1994 | Crockett | 705/9 |
| 5,335,268 | 8/1994 | Kelly, Jr. et al. | 379/112 |

(List continued on next page.)

OTHER PUBLICATIONS

Volpe, Lou; "Virtual call centers redefining the enterprise. (Voice Processing)", Telecommunications, v32, n2, p.50(2), Feb. 1998.

Denton, Hal; Using integrated approach in evaluating ACD systems, Telecommunications, v26, n11, p. 24(2), Nov. 1992.

Tower, Marc; "Tax season is conquered with help desk automation", Telemarketing and Call Center Solutions v15n3 pp: 120–121, Sep. 1996.

*Primary Examiner*—Eric W. Stamber
*Assistant Examiner*—Jagdish Patel
*Attorney, Agent, or Firm*—Merchant & Gould P.C.

[57] ABSTRACT

A rule based routing system and method is disclosed. The rule based routing system and method matches employee skills with a customer profile thereby facilitating improved customer service and identifying cross-sell opportunities. The rule based routing system and method identifies a call profile for the call, matches the call profile to 3 sales and service resource profile representing an identified resource, generates an instruction signal and routes the call to the identified resource in response to the instruction signal. The virtual sales and service center is monitored for overflow or overload conditions and load balancing and overflow rules are applied to the call in response to detection of overflow or overload conditions. The customer profile includes a language type, a customer type, a business segment identifier, a request type and a product associated with the customer.

30 Claims, 18 Drawing Sheets

U.S. PATENT DOCUMENTS

| | | | |
|---|---|---|---|
| 5,335,269 | 8/1994 | Steinlicht | 379/266 |
| 5,341,374 | 8/1994 | Lewen et al. | 370/450 |
| 5,353,339 | 10/1994 | Scobee | 379/207 |
| 5,355,403 | 10/1994 | Richardson, Jr. et al. | 379/88 |
| 5,392,345 | 2/1995 | Otto | 379/265 |
| 5,392,346 | 2/1995 | Hassler et al. | 379/265 |
| 5,402,474 | 3/1995 | Miller et al. | 379/93.12 |
| 5,404,350 | 4/1995 | DeVito et al. | 370/217 |
| 5,450,482 | 9/1995 | Chen et al. | 379/207 |
| 5,452,350 | 9/1995 | Reynolds et al. | 379/220 |
| 5,459,780 | 10/1995 | Sand | 379/265 |
| 5,467,268 | 11/1995 | Sisley et al. | 705/9 |
| 5,467,391 | 11/1995 | Donaghue, Jr. et al. | 379/265 |
| 5,546,452 | 8/1996 | Andrews et al. | 379/219 |
| 5,555,299 | 9/1996 | Maloney et al. | 379/212 |
| 5,559,877 | 9/1996 | Ash et al. | 379/221 |
| 5,590,188 | 12/1996 | Crockett | 379/225 |
| 5,590,269 | 12/1996 | Kruse et al. | 705/9 |
| 5,594,791 | 1/1997 | Szlam et al. | 379/265 |
| 5,684,870 | 11/1997 | Maloney et al. | 379/212 |
| 5,719,854 | 2/1998 | Choudhury et al. | 370/231 |
| 5,737,728 | 4/1998 | Sisley et al. | 705/8 |
| 5,768,360 | 6/1998 | Reynolds et al. | 379/220 |
| 5,822,400 | 10/1998 | Smith | 379/34 |
| 5,946,375 | 8/1999 | Pattison et al. | 379/34 |

FIG. 8

| 800-XXX-BANK | GENERAL CUSTOMER SERVICE NUMBER—FOR SALES AND SERVICE REQUESTS | ← 802 |
| --- | --- | --- |
| 800-XXX-XXXX | MEDIA PROMOTIONAL NUMBER—SAME AS XXX-BANK WITH THE DIFFERENCE BEING THE SALES OPTION IN THE VRU MAY COME BEFORE THE SERVICE OPTION. THESE CALLS WILL BE ROUTED DIRECTLY TO THE SALES GROUP. | ← 804 |
| 800-(SPANISH #) | CUSTOMER SERVICE NUMBER FOR SPANISH SPEAKING CUSTOMERS —WILL ROUTE TO A SPANISH SPEAKING CSR WITHIN A CALL CENTER | ← 806 |
| TDD NUMBER | TDD CALLS MAYBE IMPLEMENTED AS A SEPARATED NUMBER AND ROUTED TO SPECIFIC TDD EXTENSIONS. | ← 808 |
| LOCAL NUMBERS | GENERAL CUSTOMER SERVICE NUMBER IN LARGE MARKETS—WILL ROUTE TO THE NETWORK CLOUD AS A 800-XXX-BANK CALL | ← 810 |

FIG. 9

| TIME OF DAY | MONDAY TO FRIDAY | SATURDAY | SUNDAY AND HOLIDAY |
| --- | --- | --- | --- |
| PEAK | 6:00 AM TO 10 PM | 6:00 AM TO 6 PM | |
| OFF PEAK | 10:01 PM TO 5:59 AM | 6:01 PM TO 5:59 AM | 6:00 AM TO 5:59 AM (A 24 HOUR PERIOD) |

FIG. 12

| VRU EXIT POINTS | REQUEST TYPE | PRODUCT |
|---|---|---|
| MAIN MENU-ACCESS EXISTING ACCOUNT | SERVICE | N/A |
| MAIN MENU-OPEN ACCOUNT/APPLY LOAN/PRODUCT INFORMATION | SALES | N/A |
| MAIN MENU-PC BANKING | TRANSFER TO PC BANKING CENTER | N/A |
| MAIN MENU-BANKING CENTER & ATM LOCATOR | SERVICE | N/A |
| EXISTING ACCOUNT-SERVICE OR INQUIRY | SERVICE | N/A |
| EXISTING ACCOUNT-TRANSFER FUNDS/MAKE PAYMENT | SERVICE | N/A |
| EXISTING ACCOUNT-CHANGE PROFILE | SERVICE | N/A |
| EXISTING ACCOUNT-LOST/STOLEN CARD | SERVICE | N/A |
| OPEN ACCOUNT-PERSONAL | PERSONAL SALES | N/A |
| OPEN ACCOUNT-BUSINESS | BUSINESS SALES | N/A |
| BANKING CENTER/ATM LOCATOR | SERVICE | N/A |
| ACCOUNT SERVICE/INQUIRY-CHECKING | SERVICE | TRANSACTION |
| ACCOUNT SERVICE/INQUIRY-SAVINGS | SERVICE | TRANSACTION |
| ACCOUNT SERVICE/INQUIRY-CD/IRA | SERVICE | INVESTMENT |
| ACCOUNT SERVICE/INQUIRY-LOANS/LOC | SERVICE | BORROWING |
| ACCOUNT SERVICE/INQUIRY-BANKCARD | SERVICE | TRANSACTION |
| ACCOUNT SERVICE/INQUIRY-MORTGAGE | SERVICE | BORROWING |
| TRANSFER FUNDS BETWEEN ACCOUNTS | SERVICE | TRANSACTION |
| MAKE LOAN PAYMENT | SERVICE | BORROWING |
| CHANGE PROFILE | SERVICE | TRANSACTION |
| LOST/STOLEN CARD-ATM | SERVICE | TRANSACTION |
| LOST/STOLEN CARD-DEBIT | SERVICE | TRANSACTION |
| LOST/STOLEN CARD-VISA/MC | TRANSFER TO BANKCARD SERVICE CENTER | N/A |
| LOST/STOLEN CARD-BUSINESS CREDIT CARD | TRANSFER TO BUSINESS BANKCARD SERVICE CENTER | N/A |
| CHECKING-BALANCE INQUIRY | SERVICE | TRANSACTION |
| CHECHING-RECENT ACCOUNT ACTIVITY | SERVICE | TRANSACTION |
| CHECKING-DIRECT DEPOSIT & WIRE TRANSFERS | SERVICE | TRANSACTION |
| CHECKING-CHECK ORDERS | SERVICE | TRANSACTION |
| CHECKING-STATEMENT & CHECK COPIES | SERVICE | TRANSACTION |
| CHECKING-STOP PAYMENTS | SERVICE | TRANSACTION |
| SAVINGS-BALANCE INQUIRY | SERVICE | TRANSACTION |
| SAVINGS-RECENT ACCOUNT ACTIVITY | SERVICE | TRANSACTION |
| SAVINGS-DIRECT DEPOSIT/WIRE INFO | SERVICE | TRANSACTION |
| CD/IRA-BALANCE INQUIRY | SERVICE | INVESTMENT |
| CD/IRA-INTEREST INFORMATION | SERVICE | INVESTMENT |
| CD/IRA-MATURITY DATE & RENEWAL | CROSS-SELL | INVESTMENT |
| CD/IRA-DISTRIBUTION/PAYMENT INFO | CROSS-SELL | INVESTMENT |
| LOANS/LOC-BALANCE INQUIRY | SERVICE | BORROWING |
| LOANS/LOC-PAYOFF AMOUNT | CROSS-SELL | BORROWING |
| LOANS/LOC-CREDIT LIMIT | CROSS-SELL | BORROWING |
| LOANS/LOC-PAYMENT INFO | SERVICE | BORROWING |

FIG. 13

| ELEMENT | VALUES | HOW DETERMINED |
|---|---|---|
| REQUEST TYPE | SALES (YES OR NO) | DIALED 1-800-NATIONS (DNIS), SELECTED SALES ACTIVITY IN VRU |
|  | SERVICE (YES OR NO) | NOT SALES OR CROSS-SELL, FAILED TO ENTER CUSTOMER ID IN VRU |
|  | CROSS-SELL (YES OR NO) | CUSTOMER PROFILE INDICATES A CROSS-SELL, SELECTED CROSS-SELL ACTIVITY IN VRU |
| CUSTOMER TYPE | CONSUMER | CUSTOMER PROFILE INDICATES CONSUMER FAILED TO ENTER CUSTOMER ID IN VRU |
|  | BUSINESS | CUSTOMER PROFILE INDICATES BUSINESS |
| TIER | I | CUSTOMER PROFILE INDICATES TIER I |
|  | II | CUSTOMER PROFILE INDICATES TIER II, FAILED TO ENTER CUSTOMER ID IN VRU |
|  | III | CUSTOMER PROFILE INDICATES TIER III |
| PRODUCT | TRANSACTION | SELECTED TRANSACTION ACTIVITY IN VRU |
|  | INVESTMENT | SELECTED INVESTMENT ACTIVITY IN VRU |
|  | BORROWING | SELECTED BORROWING ACTIVITY IN VRU |
| LANGUAGE | ENGLISH | DIALED NON-SPANISH NUMBER (DNIS) |
|  | SPANISH | DIALED 1-800-(SPANISH) (DNIS) |

FIG. 14

| | 1400 |
|---|---|
| TYPE OF CUSTOMER BANKING — 1402 | CONSUMER<br>BUSINESS |
| SERVICE SKILLS — 1404 | SALES<br>SERVICE<br>CROSS-SELL |
| LANGUAGE SPOKEN — 1406 | SPANISH<br>ENGLISH |
| SUPERVISOR — 1408 | YES<br>NO |
| CUSTOMER SEGMENT — 1410 | TIER I<br>TIER II<br>TIER III |
| PRODUCT SKILLS — 1412 | TRANSACTIONS<br>INVESTMENTS<br>BORROWING |
| AGENT EXTENSION — 1414 | EXTENSIONS ARE AVAILABLE ACROSS CALL CENTERS |

FIG. 15

| | | |
|---|---|---|
| LOAD BALANCING | CALLS ROUTED TO THE AGENT WITHIN AN AGENT SKILL GROUP WHO HAS BEEN AVAILABLE FOR THE LONGEST AMOUNT OF TIME. | 1504 |
| OVERFLOW | OVERFLOW RULES ARE USED TO ROUTE CALLS TO OTHER AGENTS OR CALL CENTERS WHEN EXACT MATCH OF CALL ROUTING PROFILE AND AGENT PROFILE IS UNAVAILABLE. ONLY ONE OVERFLOW RULE PER AGENT PROFILE WILL BE IMPLEMENTED IN RELEASE 1. OVERFLOW CONDITIONS WILL IMPLEMENTED AFTER APPROPRIATE WAIT TIMES. | 1508 |
| PRIORITY ROUTING | CALLS WHICH ARE WAITING FOR AN AVAILABLE GROUP OF AGENTS WILL BE PRIORITIZED ACCORDING TO: | |
| | CUSTOMER VALUE: TIER 1 CALLS ARE TREATED FIRST OTHER TIERS ARE TREATED EQUALLY | 1512 |
| | TRANSFER FROM AGENTS: TRANSFERS FROM AGENTS WILL ASSUME PRIORITY IN HOLD PATTERN | 1514 |
| | OVERFLOW CONDITIONS | 1516 |
| MULTIPLE AGENT PROFILES | MULTIPLE AGENT PROFILES (2) CAN BE ENTERED PER AGENT | 1520 |

FIG. 16

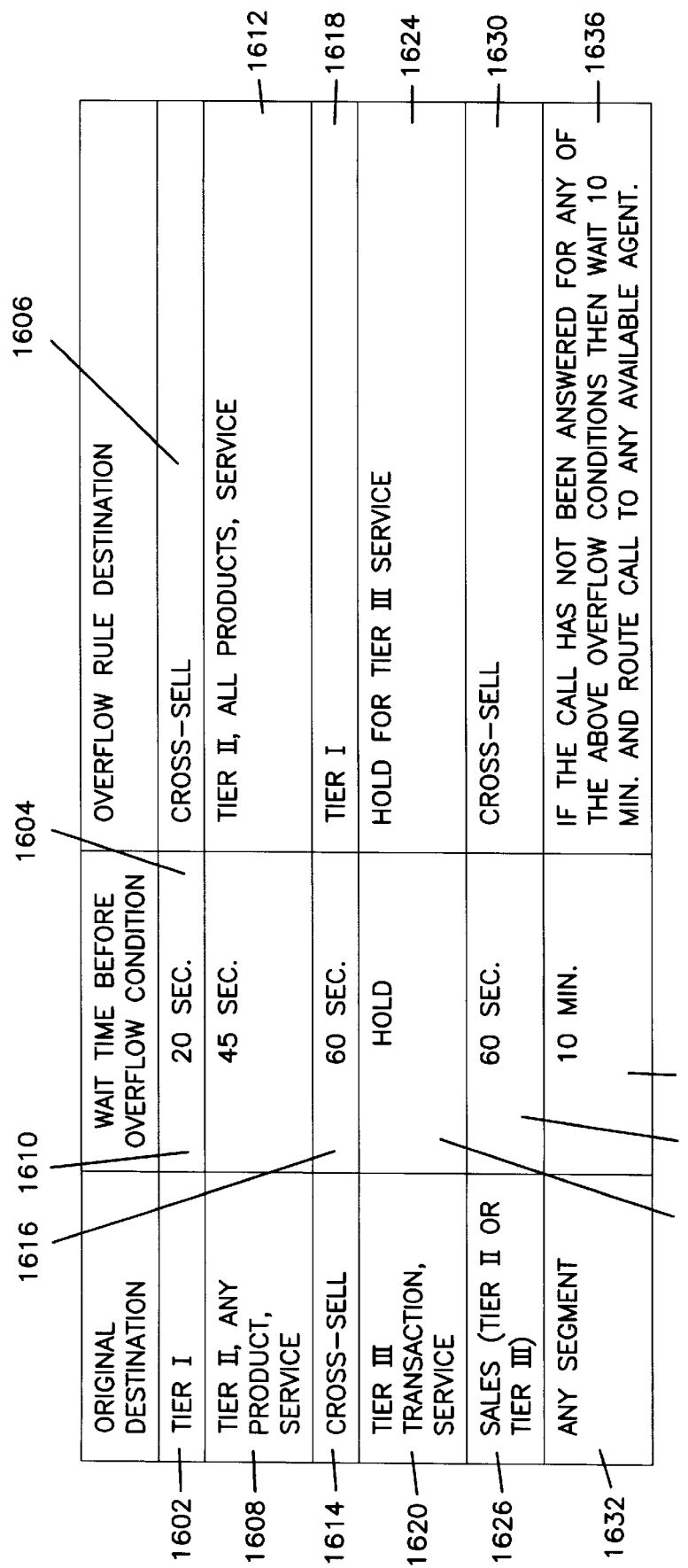

| ORIGINAL DESTINATION | WAIT TIME BEFORE OVERFLOW CONDITION | OVERFLOW RULE DESTINATION |
|---|---|---|
| TIER I | 20 SEC. | CROSS-SELL |
| TIER II, ANY PRODUCT, SERVICE | 45 SEC. | TIER II, ALL PRODUCTS, SERVICE |
| CROSS-SELL | 60 SEC. | TIER I |
| TIER III TRANSACTION, SERVICE | HOLD | HOLD FOR TIER III SERVICE |
| SALES (TIER II OR TIER III) | 60 SEC. | CROSS-SELL |
| ANY SEGMENT | 10 MIN. | IF THE CALL HAS NOT BEEN ANSWERED FOR ANY OF THE ABOVE OVERFLOW CONDITIONS THEN WAIT 10 MIN. AND ROUTE CALL TO ANY AVAILABLE AGENT. |

FIG. 19

| Scenario | Customer Type: Language | Customer Type: Type of Customer | Customer Type: Segment | Customer Type: Request Type | Customer Type: Product | Agent Type: Language | Agent Type: Type of Customer | Agent Type: Segment | Agent Type: Request Type | Agent Type: Product | Call Treatment / Wait Time (#)/*(time in sec) | Overflow Agent Type: Language | Overflow Agent Type: Type of Customer | Overflow Agent Type: Segment | Overflow Agent Type: Request Type | Overflow Agent Type: Product | Call Treatment / Wait Time (#)/*(time in sec) | Overflow All Agent Type: Language | Overflow All Agent Type: Type of Customer | Overflow All Agent Type: Segment | Overflow All Agent Type: Request Type | Overflow All Agent Type: Product | Call Treatment / Wait Time (#)/*(time in sec) |
|---|---|---|---|---|---|---|---|---|---|---|---|---|---|---|---|---|---|---|---|---|---|---|---|
| 1 | ENGLISH | CONSUMER | TIER 1 | ANY | ANY | ENGLISH | CONSUMER | TIER 1 | | | (#851)/(20) | ENGLISH | CONSUMER | TIER 2 OR 3 | CROSS SELL | | (#851)/(580) | | | | | | (#10)/* |
| 2 | ENGLISH | CONSUMER | TIER 2 OR 3 | CROSS SELL | ANY | ENGLISH | CONSUMER | TIER 2 OR 3 | CROSS SELL | | (#861)/(60) | ENGLISH | CONSUMER | TIER 1 | | | (#861)/(540) | | | | | | (#851)/* |
| 3 | ENGLISH | CONSUMER | TIER 2 | SERVICE | TRANSACTIONS | ENGLISH | CONSUMER | TIER 2 | SERVICE | TRANSACTIONS | (#861)/(45) | ENGLISH | CONSUMER | TIER 2 | SERVICE | | (#861)/(555) | | | | | | (#851)/* |
| 4 | ENGLISH | CONSUMER | TIER 2 | SERVICE | BORROWING | ENGLISH | CONSUMER | TIER 2 | SERVICE | BORROWING | (#861)/(45) | ENGLISH | CONSUMER | TIER 2 | SERVICE | | (#861)/(555) | | | | | | (#851)/* |
| 5 | ENGLISH | CONSUMER | TIER 2 | SERVICE | INVESTMENTS | ENGLISH | CONSUMER | TIER 2 | SERVICE | INVESTMENTS | (#861)/(45) | ENGLISH | CONSUMER | TIER 2 | SERVICE | | (#861)/(555) | | | | | | (#851)/* |
| 6 | ENGLISH | CONSUMER | TIER 3 | SERVICE | TRANSACTIONS | ENGLISH | CONSUMER | TIER 3 | SERVICE | TRANSACTIONS | (#871)/(600) | | | NO OVERFLOW | | | (#871)/* | | | | | | (#871)/* |
| 7 | ENGLISH | BUSINESS | TIER 1 | ANY | ANY | ENGLISH | BUSINESS | TIER 1 | | | (#850)/(20) | ENGLISH | BUSINESS | TIER 2 OR 3 | CROSS SELL | | (#850)/(580) | | | | | | (#850)/* |
| 8 | ENGLISH | BUSINESS | TIER 2 | CROSS SELL | ANY | ENGLISH | BUSINESS | TIER 2 | CROSS SELL | | (#860)/(60) | ENGLISH | BUSINESS | TIER 1 | | | (#860)/(540) | | | | | | (#860)/* |
| 9 | ENGLISH | BUSINESS | TIER 2 | SERVICE | TRANSACTIONS | ENGLISH | BUSINESS | TIER 2 | SERVICE | TRANSACTIONS | (#860)/(45) | ENGLISH | BUSINESS | TIER 2 | SERVICE | | (#860)/(555) | | | | | | (#860)/* |
| 10 | ENGLISH | BUSINESS | TIER 2 | SERVICE | BORROWING | ENGLISH | BUSINESS | TIER 2 | SERVICE | BORROWING | (#860)/(45) | ENGLISH | BUSINESS | TIER 2 | SERVICE | | (#860)/(555) | | | | | | (#860)/* |
| 11 | ENGLISH | BUSINESS | TIER 2 | SERVICE | INVESTMENTS | ENGLISH | BUSINESS | TIER 2 | SERVICE | INVESTMENTS | (#860)/(45) | ENGLISH | BUSINESS | TIER 2 | SERVICE | | (#860)/(555) | | | | | | (#860)/* |
| 12 | SPANISH | CONSUMER | TIER 1 | ANY | ANY | SPANISH | CONSUMER | TIER 1 | | | (#852)/(20) | SPANISH | CONSUMER | TIER 2 OR 3 | CROSS SELL | | (#852)/(580) | | | | | | (#851)/* |
| 13 | SPANISH | CONSUMER | TIER 2 OR 3 | CROSS SELL | ANY | SPANISH | CONSUMER | TIER 2 OR 3 | CROSS SELL | | (#862)/(60) | SPANISH | CONSUMER | TIER 1 | | | (#862)/(540) | | | | | | (#851)/* |
| 14 | SPANISH | CONSUMER | TIER 2 | SERVICE | TRANSACTIONS | SPANISH | CONSUMER | TIER 2 | SERVICE | TRANSACTIONS | (#862)/(45) | SPANISH | CONSUMER | TIER 2 | SERVICE | | (#862)/(555) | | | | | | (#851)/* |
| 15 | SPANISH | CONSUMER | TIER 2 OR 3 | SERVICE | BORROWING | SPANISH | CONSUMER | TIER 2 OR 3 | SERVICE | BORROWING | (#862)/(45) | SPANISH | CONSUMER | TIER 2 | SERVICE | | (#862)/(555) | | | | | | (#851)/* |
| 16 | SPANISH | CONSUMER | TIER 2 OR 3 | SERVICE | INVESTMENTS | SPANISH | CONSUMER | TIER 2 OR 3 | SERVICE | INVESTMENTS | (#862)/(45) | SPANISH | CONSUMER | TIER 2 | SERVICE | | (#862)/(555) | | | | | | (#851)/* |
| 17 | SPANISH | CONSUMER | TIER 3 | SERVICE | TRANSACTIONS | SPANISH | CONSUMER | TIER 3 | SERVICE | TRANSACTIONS | (#872)/(600) | | | NO OVERFLOW | | | (#872)/* | | | | | | (#872)/* |
| 18 | SPANISH | BUSINESS | TIER 1 | ANY | ANY | SPANISH | BUSINESS | TIER 1 | | | (#852)/(20) | SPANISH | BUSINESS | TIER 2 OR 3 | CROSS SELL | | (#852)/(580) | | | | | | (#851)/* |
| 19 | SPANISH | BUSINESS | TIER 2 | CROSS SELL | ANY | SPANISH | BUSINESS | TIER 2 | CROSS SELL | | (#862)/(60) | SPANISH | BUSINESS | TIER 1 | | | (#862)/(540) | | | | | | (#862)/* |
| 20 | SPANISH | BUSINESS | TIER 2 | SERVICE | TRANSACTIONS | SPANISH | BUSINESS | TIER 2 | SERVICE | TRANSACTIONS | (#862)/(45) | SPANISH | BUSINESS | TIER 2 | SERVICE | | (#862)/(555) | | | | | | (#862)/* |
| 21 | SPANISH | BUSINESS | TIER 2 | SERVICE | BORROWING | SPANISH | BUSINESS | TIER 2 | SERVICE | BORROWING | (#862)/(45) | SPANISH | BUSINESS | TIER 2 | SERVICE | | (#862)/(555) | | | | | | (#862)/* |
| 22 | SPANISH | BUSINESS | TIER 2 | SERVICE | INVESTMENTS | SPANISH | BUSINESS | TIER 2 | SERVICE | INVESTMENTS | (#862)/(45) | SPANISH | BUSINESS | TIER 2 | SERVICE | | (#862)/(555) | | | | | | (#862)/* |
| 23 | ENGLISH | NOT IDENTIFIED | | | | ENGLISH | CONSUMER | TIER 2 | SERVICE | TRANSACTIONS | (#861)/(45) | ENGLISH | CONSUMER | TIER 2 | SERVICE | | (#861)/(555) | | | | | | (#851)/* |
| 24 | SPANISH | NOT IDENTIFIED | | | | SPANISH | CONSUMER | TIER 2 | SERVICE | TRANSACTIONS | (#862)/(45) | SPANISH | CONSUMER | TIER 2 | SERVICE | | (#862)/(555) | | | | | | (#852)/* |

* TREATMENT WILL CONTINUE UNTIL CALL IS DELIVERED, UNLESS WAIT TIME IS SPECIFIED

RULE BASED ROUTING SYSTEM AND METHOD FOR A VIRTUAL SALES AND SERVICE CENTER

CROSS-REFERENCE TO RELATED APPLICATIONS

This application is related to:

Application Ser. No. 09/062,151, entitled "A Virtual Customer Sales and Service Center And Method," filed on same date herewith by Charles McDonough et al., and assigned to the assignee of this application;

Application Ser. No. 09/062,492, entitled "Context Manager and Method For A Virtual Sales and Service Center," filed on same date herewith by Jim Smith et al., and assigned to the assignee of this application; and Application Ser. No. 09/061,999, entitled "Quality Center and Method For A Virtual Sales and Service Center," filed on same date herewith by Charles McDonough et al., and assigned to the assignee of this application.

All of the above-identified applications are incorporated by reference herein.

BACKGROUND OF THE INVENTION

1. Field of the Invention.

This invention relates in general to a Virtual Sales and Service Center, and more particularly to a method and apparatus for connecting a customer to any type of sales and service resource through any access method at any time from any customer location.

2. Description of Related Art.

In the United States, telecommunications is an industry that is undergoing convergence. There is a good deal of discussion about the consolidation of computing and telecommunications into one overarching entity. There is also lot of talk about one wire to the home and one even larger wire or cable to the business.

The trend toward universal data access has brought the focus of two technologies to the solution of a single problem, i.e., integrating telephones and computers to provide access and control of the data residing on both platforms. Computer telephone integration (CTI) is a technology platform that merges voice and data services at the functional level to add tangible benefits to business applications. CTI technology combines voice and data to form a foundation to support business applications, seamlessly combining functions from both the telephony world and the computing world.

Over the years, telecommunications and data technologies have grown more alike. The independent features offered by telephones and computers become even more powerful, useful, and convenient when combined into voice processing applications running on computers. In today's business environment, the telephone is often the primary means of communication in many different situations: placing catalog orders, checking airline schedules, querying prices, reviewing account balances, and recording and retrieving messages. Usually, each telephone call involves a service representative talking to a caller, asking questions, entering responses into a computer, and reading information to the caller from a terminal screen.

When organizations automate this process by linking their computer and telephone systems, they can lower costs, provide better customer service, increase the number of services available, and extend hours of operation. CTI lets customers, for example, use their touch-tone phone to check their bank balance 24 hours a day rather than walk to a cash machine or wait on hold for a customer service representative. And the marriage of phone and computer systems can identify incoming calls, route them to the appropriate person, and deliver the caller's file on a computer screen to the person answering the call—before the call is answered. Accordingly, the road to greater profit runs through a call center for high quality, low-cost customer acquisition and retention.

Today's computer-telephone integration offerings enhance a range of emerging technologies, such as:

Interactive voice response: the ability to input and retrieve information from a computer database via a touch-tone phone;

Fax publishing: the ability to request that fax information be automatically forwarded to the caller via touch-tone phone;

Two-way message notification: the ability to link voice mail and electronic mail (E-mail) systems so that users can collect all messages—voice and data—via a single source CTI provides many benefit to consumers. For example, CTI allows consumers to spend less time on hold, improves response time for callers once they get through to the company, allows instant access to database information, often on a 24-hour basis; provides callback options for callers who don't want to stay on hold, provides access to service reps who, when freed from routine functions, have more time to research and answer complicated questions, and eliminates the need to repeat identification information and reason for calling when transferred to another employee or department.

Businesses also benefit from the use of CTI. For example, the benefits of CTI to business includes prompter and more accurate response to inquiries, orders, and service requests, personalized attention and efficient problem resolution, improved customer and prospects access to information about new products and services, increased number of services available and extended hours of operation Increased telesales revenue, higher levels of referral and repeat business, fewer data entry keystroke errors, shorter transaction time, increased employee productivity, improved employee morale, and cost savings from operational efficiency.

Today, the majority of CTI applications are being built for call centers. A call center is a customer business center where initial access is by telephone. Employees working in call centers provide services over the telephone. Their tasks can include placing outgoing calls, answering incoming calls, asking callers for information, or providing services. While handling calls, employees often use desktop computers to enter or retrieve information.

Current call center routing techniques can be difficult to manage and do not simplify the interaction for customers. Routing services within a call center have traditionally been provided through caller initiated functions such as selecting one of several 800 numbers or making a particular selection in the VRU. The routing services do not provide for an effective match of skilled employees with customer value and need. Multi-site call center routing is typically a simple percentage allocation of calls to various sites achieved through the network carrier. Overflow services are managed through the re-assignment of employees to queues. The goal in all these methods is to provide some level of improved service to the customer through a better match of calls to skilled employees and a better use of available Customer Service Representatives (CSRs). These approaches require many different mechanisms to provide call routing. These mechanisms include: various 800 numbers, network carrier load balancing, VRU routing to queues and static realignment of employees to queues.

The typical CTI call center makes use of products and services from several different sources: public and private networks; voice switches, automatic call distributors, hardware and software from computer vendors, specialized business applications from software suppliers, and components such as voice response units, voice mail systems, call sequencers, predictive dialers, and fax machines.

Further, prior CTI call centers have not maximized the efficiency and productivity of employees with the call centers by limiting their routing rules to assigning a call to a particular group of employees (queuing). Once the call was assigned to a particular queue the call was then assigned to the least busy employee in the queue. The queue methodology is effective at segmenting and distributing calls. However, it is cumbersome and inefficient to expand the number of queues in a call center. Queues must be defined for the automated call distributors (ACDs), employees must be defined to the queue, and employees must be available to the queue. Only limited overflow capabilities exist in the queue environment.

Furthermore, current call centers suffer from several disadvantages. For example, current call centers rely upon multiple numbers which cause customer confusion. Current call centers do not provide service levels which are customized to customer value. Only to a limited degree are employee skills matched to customer request. Current call centers manage overflow services through scheduling and re-assignment of employees and use multiple control points for routing, which makes routing management difficult.

Also, prior CTI call centers have not had the ability to connect a customer to any type of sales and service resource through any access method at any time from any customer location.

Further, prior CTI call centers have not even attempted to deal with resources outside the traditional call center domain of VRUs and employees. Whether large or small, call centers are still departments within a larger enterprise. Often, other departments have customer sales and service resources. Other departments may include office, branches, third party locations, etc. Call center technology improvements are typically not shared with these departments and the resources within. As a result, the customer cannot contact those resources as easily as they can those in a call center. Nor can call centers and other departments be effectively coordinated to improve sales and service quality while reducing costs.

In regard to access method, many companies are dealing with the new access method types for remote customer interaction including, but not limited to, e-mail, Internet/Web, fax, and kiosks. These are most often dealt with separately from call centers.

It can be seen that there is a need for a virtual customer sales and service center which connects any customer to any resource through any access method at any time from any customer location.

It can also be seen that there is a need for a common technology platform which support all forms of customer interaction including customer self sales and service as well as employee assisted sales and service.

It can also be seen that there is a need for a virtual customer sales and service center which maximizes the efficiency and productivity of the entire enterprise's sales and service resources.

It can also be seen that there is a need for a rule based routing engine in a Virtual Sales and Service Centers that can dynamically make the trade-offs between the desired customer experience and the effective and efficient utilization of sales and service resources.

It can also be seen that there is a need for a rule based routing method that improves revenue opportunities by considering potential cross-sell opportunities, routing the customer contact to an appropriate resource and directing that resource to execute a cross-sell attempt.

SUMMARY OF THE INVENTION

To overcome the limitations in the prior art described above, and to overcome other limitations that will become apparent upon reading and understanding the present specification, the present invention discloses a rule based routing system and method.

The present invention solves the above-described problems by matching sales and service resource skill profiles with a customer profile, contact type and request type thereby facilitating improved customer service, better resource utilization and identifying cross-sell opportunities.

A system in accordance with the principles of the present invention includes a customer profile database for storing a plurality of customer types, a sales and service resource profile data base for storing a plurality of primary resource types, first overflow resource types and second overflow resource types, a receiver for receiving customer data from a VRU handling a customer call and a processor for determining a customer type based upon the customer data and identifying a matching primary resource for routing the customer to the identified primary resource.

Other embodiments of a system in accordance with the principles of the invention may include alternative or optional additional aspects. One such aspect of the present invention is that the customer types comprise an identification of customer subfields, wherein the subfields comprise a language, a type of customer, a segment, a request type and a product(s).

Another aspect of the present invention is that the segment comprises a grouping of like customers based on factors including, but not limited to their demographics, behaviors, values, current products used and the current and potential value of the customer to a company's business.

Another aspect of the current invention is that the contact type may be either synchronous, where the customer is waiting for an immediate response, or asynchronous, where the customer expects a timely, but not immediate response. A phone call is an example of a synchronous contact and an e-mail is an example of an asynchronous contact.

Another aspect of the present invention is that the request type comprises a sales or service request.

Still another aspect of the present invention is that the request type may be either be explicitly stated by the customer or inferred from the customer profile or customer action during the course of the customer contact.

Another aspect of the present invention is that the cross-sell opportunity type may be determined from either or both the customer profile and the customer's action during the course of the customer contact.

Another aspect of the present invention is that the processor identifies a first overflow resource and a second overflow resource for routing the customer to when the identified primary resource is unavailable.

Another aspect of the present invention is that a timing device may be included for placing a synchronous customer contact on hold for a first predetermined period of time when the identified resource is unavailable.

Yet another aspect of the present invention is that the processor identifies a first overflow resource for routing the customer to when the identified primary resource is unavailable and a second overflow resource for when the first overflow resource is unavailable.

Another aspect of the present invention is that the processor routes the customer to the overflow resource according to expiration of a first and second predetermined period of time.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 8 illustrates services for a business which can be assigned to a DNIS;

FIG. 9 illustrates one example of a table of times for day/time dependent routing;

FIG. 12 illustrates a table defining the Request Type, and Product or Transfer which corresponds to various possible exit points from a VRU;

FIG. 13 illustrates a table of the elements, values and method of determination for the call profile;

FIG. 14 illustrates a table for the resource profiles;

FIG. 15 illustrates the Load Balancing Characteristics;

FIG. 16 is a chart illustrating implementation of overflow rules;

FIG. 19 is a chart used in implementing one embodiment of a rule based routing schedule according to the present invention.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention is a Virtual Sales and Service Center that provides connection of customers to any type of sales and service resource through any access method at any time from any customer location.

Figure 1:
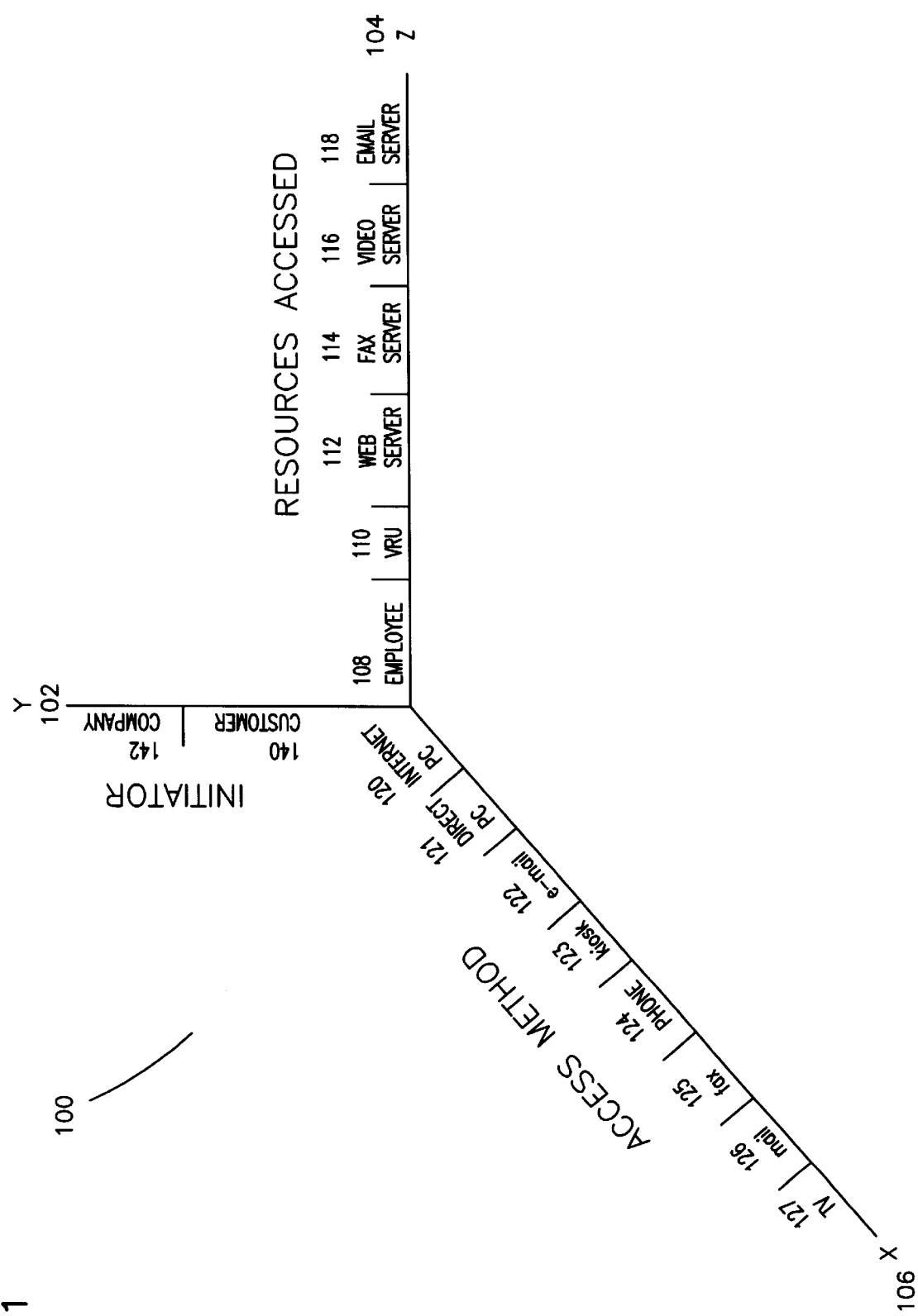
FIG. 1 illustrates a three dimensional representation of the Virtual Sales and Service Center access logistics.

FIG. 1 illustrates a three dimensional representation of the Virtual Sales and Service Center access logistics 100. In FIG. 1, the y axis 102 represents the contact initiator. A customer contact may either be initiated by the customer 140 or by the company 142.

The x axis 106 represents access method of the customer. Customers may access the Virtual Sales and Service Center from a wide variety of locations using a variety of methods. For example, a customer may access a company through the Internet 120. A customer may access a web page to retrieve customer or company information. The information at the web page may be unsecured information concerning a company's services and/or products. Alternatively, a customer may access secured, personal or private information via encryption, authentication and other digital security measures. Those skilled in the art will recognize that the invention is not limited to a particular instrumentality however.

Other customer access methods may include direct pc access 121, e-mail 122, kiosk 123, phone 124, fax 125, mail 126, tv 127 etc. Those skilled in the art will recognize that the type of customer access method is not meant to be limited to the particular examples outlined herein. The invention provides the interface with any type of customer hardware and access method.

The z axis 104 represents the resources accessed during the contact with the company. The types of resources accessed may include an employee 108. Employees 108 may be in thousands of locations ranging from large call centers with hundreds of persons to small offices or branches with a single person. The skills of employees may vary tremendously including product knowledge, language, sales ability, knowledge of specific customers, etc. As a result, the logistics associated with effectively matching customer contacts are particularly challenging and the benefits are particularly high.

Other resources accessed by customers include the VRU 110, web server 112, fax server 114, video server 116, e-mail server 118, etc. Those skilled in the art will recognize that the type of resource is not meant to be limited to the particular examples outlined herein. The invention provides the interface with any type of resource existing within the company.

Figure 2:
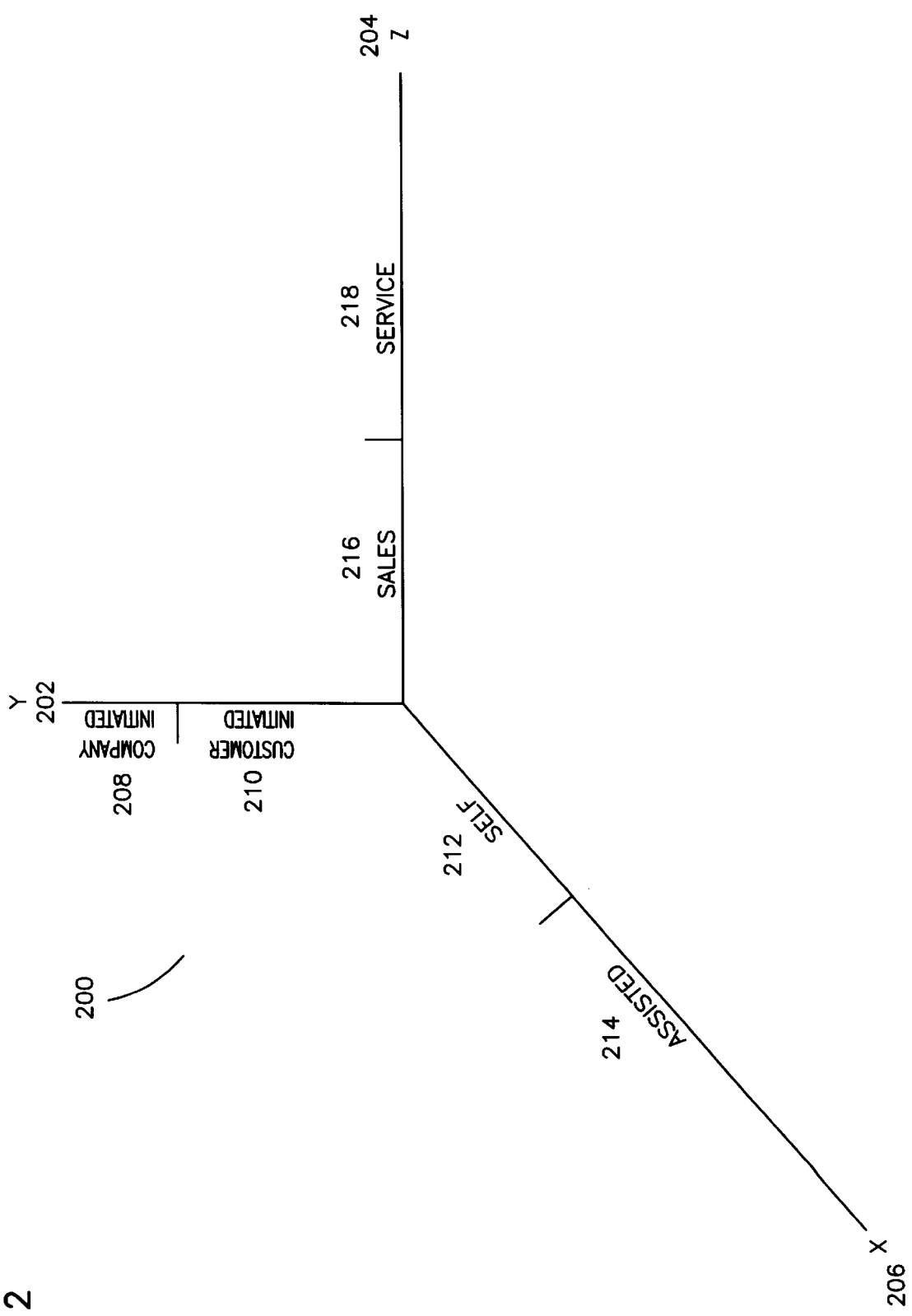
FIG. 2 illustrates the range of customer interactions included with in the scope of the invention.

FIG. 2 illustrates the types of customer interaction 200 included in the scope of this invention.

The y axis 202 represents the initiator. A customer contact may either be initiated by the customer 210 or by the company 208.

The z axis 204 represents the customer purpose. The overall purpose may be sales 216 or service 218.

The x axis 206 represents the interaction style. The interaction style may be self-assisted 212 or assisted 212.

The invention includes the routing and customer-resource matching algorithms to effectively handle any interaction style within the framework shown in FIG. 2

Figure 3:
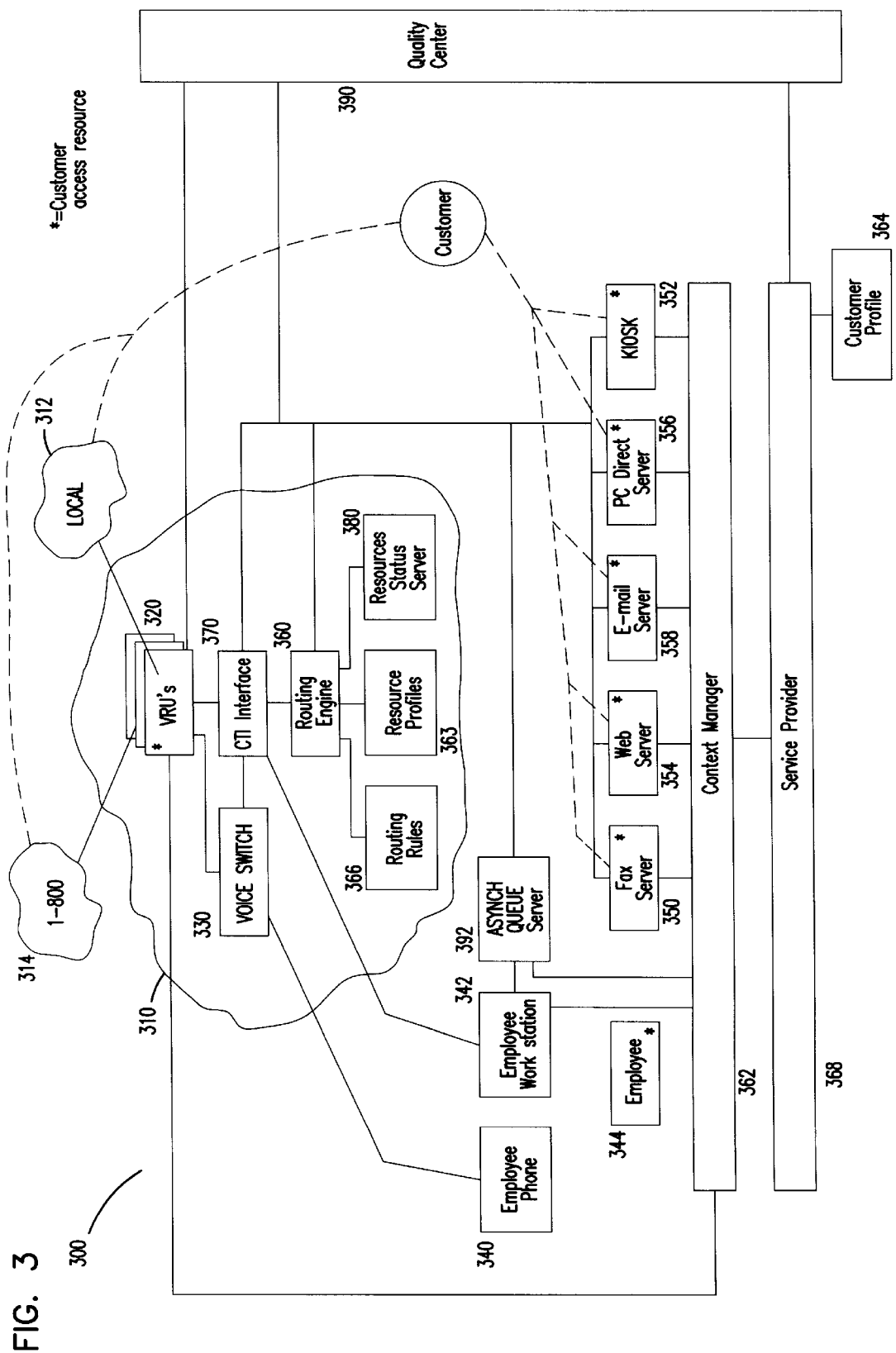
FIG. 3 illustrates a functional diagram of the Virtual Sales and Service Center according to the present invention.

FIG. 3 illustrates a functional diagram of the Virtual Sales and Service Center 300 according to the present invention. Depending on the customer's access method, a number of different resources may accept the initial contact with the customer.

In many companies, the phone is a high volume access method. In the invention a cloud 310 is established to source calls to the Virtual Sales and Service Center 300. All calls, including local numbers 312 and 1-800 numbers 314, are delivered to this cloud 310. Within the cloud 310 are Voice Response Units (VRUs) 320 which play a script that is heard by incoming customers placing calls to the Virtual Sales and Service Center 300. The script played by the VRUs 320 enables a customer profile to be identified. The content of the script is then personalized for each customer, including matching the language being spoken by the caller. The VRUs 320 offer a convenient navigation interface and can both meet customer requests directly or initiate navigation to a resource that can handle the customer request. The VRUs 320 can also execute some cross-sell activities.

Should it be determined that a call needs to be directed to a company employee or other resource, the VRUs interact with the routing engine 360 through the CTI interface 370 to initiate the transfer. The routing engine 360 accesses ANI and DNIS information, customer profile information 364, VRU activity thus far, the routing rules 366, resource profiles 363, and the resource status server 380 to select an available resource based on the customer's expressed or implied need.

ANI is a service offered by telephone networks that provides the billing directory number associated with a calling party. When a customer calls an 800 number to order from a catalog, the call arrives at the call center with the caller's telephone number. The telephone number is passed to a CTI server 370.

Organizations that maintain multiple 800 numbers can also use Dialed Number Identification Services (DNIS) offered by carriers to identify what the caller wishes to discuss. A bank, for example, can assign 800-555-1333 to VISA cards and 800-555-1334 to VISA Gold cards.

The Virtual Sales and Service Center 300 according to the present invention may combine the use of ANI and DNIS with the other information available to it. Furthermore, CTI systems 370 using ANI make it possible for companies to capture information about abandoned calls. If a customer hangs up while waiting for any type of sales and service resource employees can pro-actively call back customers and offer to be of assistance.

Routing rules 366 are not based on a single queue or gate (e.g. Service) but can be governed by which resource skills can most accurately address the request. Once any type of sales and service resource has obtained a new skill or improved on an existing skill, it becomes a simple task of updating that skills profile 364. Similarly, if additional customer information needs to be included in the routing rules 366, the customer profile 364 is updated to include the routing criteria. Overflow rules within the routing rules 366 are also automated to allow for increased call center management.

Upon obtaining all relevant available requirements information the routing application 360 will access the resource profiles 363 to find resources with the appropriate skills. This resulting set of resources will be used when accessing a statistics server 380 to determine which resources are currently available for the contact. The statistics server 380 provides a real time status of each of the resources' availability. A specific resource will then be selected based on resource availability, skill profiles, and load balancing. If the statistics server 380 indicates that the optimal resource is not available, the routing engine 360 will check its routing rules 366 for overflow processing.

If the overflow resources are available, the call and associated data will be routed to those resources. If the original destination resource and the first overflow resources are not available, the call will be routed to another resource based upon the routing rules.

The routing engine 360 then notifies the VRU 320 with the appropriate call treatment and routing authorization once a resource is selected. The VRUs 320 then send the call to the switch 330 which interacts with the CTI interface 370 to determine the appropriate employee 344 and phone 340. The CTI interface 370 also interacts with the workstation 343 associated with the phone 344 and ensures a screen pop, which provides the employee with the key information such as the customer identity, their need and the presence of a cross-sell opportunity, is delivered at the same time as the actual customer phone call is delivered to the phone 340 by the switch 330.

Contacts may also arrive at a web server 354, a home PC direct connection server 356, a kiosk 353, an e-mail server 358 or a fax server 350.

In all cases, every customer contact is immediately logged with the context manager 362. The Context Manager 350 manages the complexity of dealing with multiple customer interaction devices which must share common business processes. These business processes are distributed across many underlying, heterogeneous systems. The Context manager 362 provides for the management of information which is required over the life of a business event. The Context Manager 350 coordinates access to the appropriate Service Providers 368 and provides the Service Provider 368 the context to complete the business transaction.

As a contact progresses, the VRU 320, the employee workstation 343, the web server 354, the kiosk 353, the fax server 350, the e-mail server 358 and the PC direct server 356 continually interact with the context manager 362.

Contacts may be transferred between resources many times during the course of a call and this transfer activity is coordinated by the context manger 363 and the routing engine 360.

If the contact is asynchronous or if there is work which was initiated but not completed during the course of a synchronous contact, resources may request that the context manager 362 place a request with an asynchronous queue server 392. The routing engine 360 will coordinate the subsequent matching of that request with an available resource which will most often be an employee 344, but may be other resource types.

The Virtual Sales and Service Center 300 uses a suite of products to enable intelligent contact routing in a network cloud, including customer profiles 364, employee skills profiles 363, VRU options 320, availability of employees 340, and overflow management within the routing rules 366. In the preferred embodiment, Genesys computer telephony processing components 360 370 380 provides optimized and flexible solutions to transform the operations from simple interactions between phone calls and voice switch queues into sophisticated high value information exchanges that accomplish real-time matching of customer contacts through any access method with the appropriate resources.

All components in FIG. 3 communicate via LAN-based TCP/IP messaging. This open, distributed architecture provides a scaleable and adaptable solution.

Figure 4:
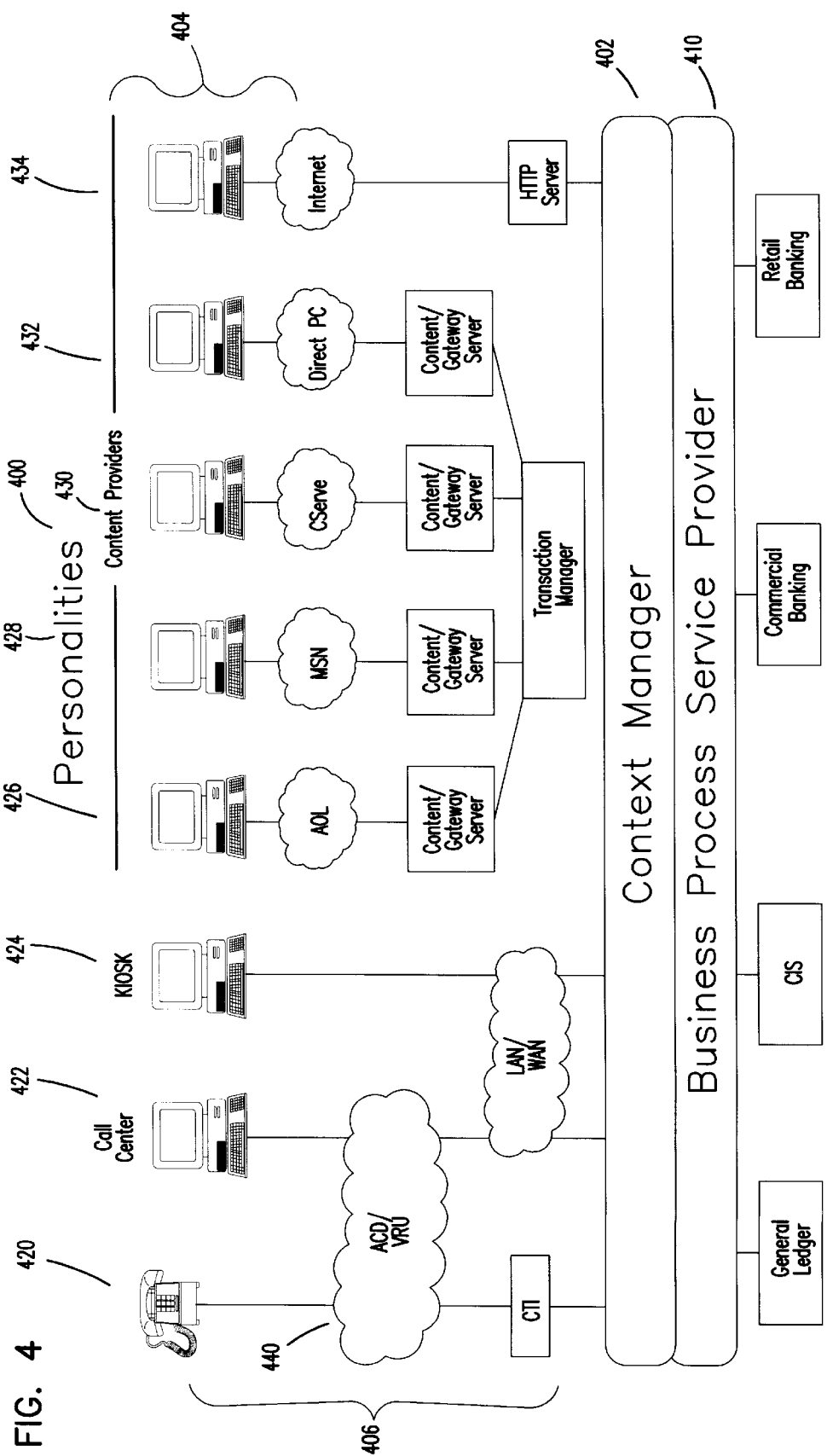
FIG. 4 illustrates an overview of the Context Manager.

FIG. 4 illustrates an overview 400 of the Context Manager 402. The Context Manager 402 provides management capability for multiple customer access resources 404 which share common business processes that may be distributed across many underlying, heterogeneous systems 406. The Context Manager 402 provides the management of information required over the life of the business event. The Context Manager 402 coordinates access to the appropriate business processes and provides them the context to complete each business unit of work.

The Context Manager 402 provides the interface between the business process service provider 410 and the different customer access resources 420–434. Customer access resource types 420–434 are often defined very broadly. Within each type there will be many variants which not only vary due to their specific purpose, but also vary in their behavior as they personalize the customer experience.

While intelligent routing provides rich functionality, the data it uses to make decisions on call attributes must be processed very fast. Customer profiles, customer accounts, and traditional account data will be accessed by a VRU 440 and customer initiated VRU events will be passed to a service provider 410. The service provider 410 maintains the business logic in channel independent applets.

The service provider 410 applies decision logic to determine the customers needs. The result will be a call routing profile that the intelligent routing engine will use to match against the centrally maintained employee profile. The result will be an intelligent routing rule based on custom call profile and skilled employee availability.

The cloud 440 will pass pertinent routing information to the service provider 410 from the VRU. The service provider 410 will then perform a logical combine of the VRU attributes and the customer profile attributes to determine the true routing attributes of the call. For example, in the context of banking, if a customer performed a loan payoff request in the VRU and had a cross-sell indicated on their customer profile, then the routing profile would indicate that a cross-sell was "Yes". This routing information may include tier, product(s), type of service, type of customer banking, language captured from DNIS, and number of transfers indicator.

The present invention emphasizes the use of Component and Object Technology. The Object Management Group's (OMG) Common Object Request Broker Architecture (CORBA) may be used for distributed computing and object messaging. In this manner, product availability, openness and functionality goals can be satisfied.

With the introduction of a Virtual Sales and Service Center, some of the current activities that take place at each employee site will change. Rather than managing each location as a separate facility, all centers will be managed and operated as a single virtual organization. There are also workforce implications with the implementation of this new environment.

Turning again to FIG. 3, a centralized operating unit, referred to as the Quality Center 390, will perform the Virtual Sales and Service Center monitoring and reporting functions. The Quality Center 390 integrates and aids in managing a plurality of physical locations, employee types and technology resources as a single Virtual Sales and Service Center 300. The functions pertaining to managing the business through the Quality Center 390 are organized into the following eight categories:

Scheduling and Forecasting,
Performance Measurement and Feedback,
Contact Monitoring and Routing,
Analysis,
Help Desk,
Quality and Continuous Improvement,
Maintenance and
Broadcast Messaging.

These functions support the overall business process associated with operating a Virtual Sales and Service Center environment. Within each business area, the focus is on distinct business processes needed to operate and support a multi-site, Virtual Sales and Service Center environment.

Figure 5:
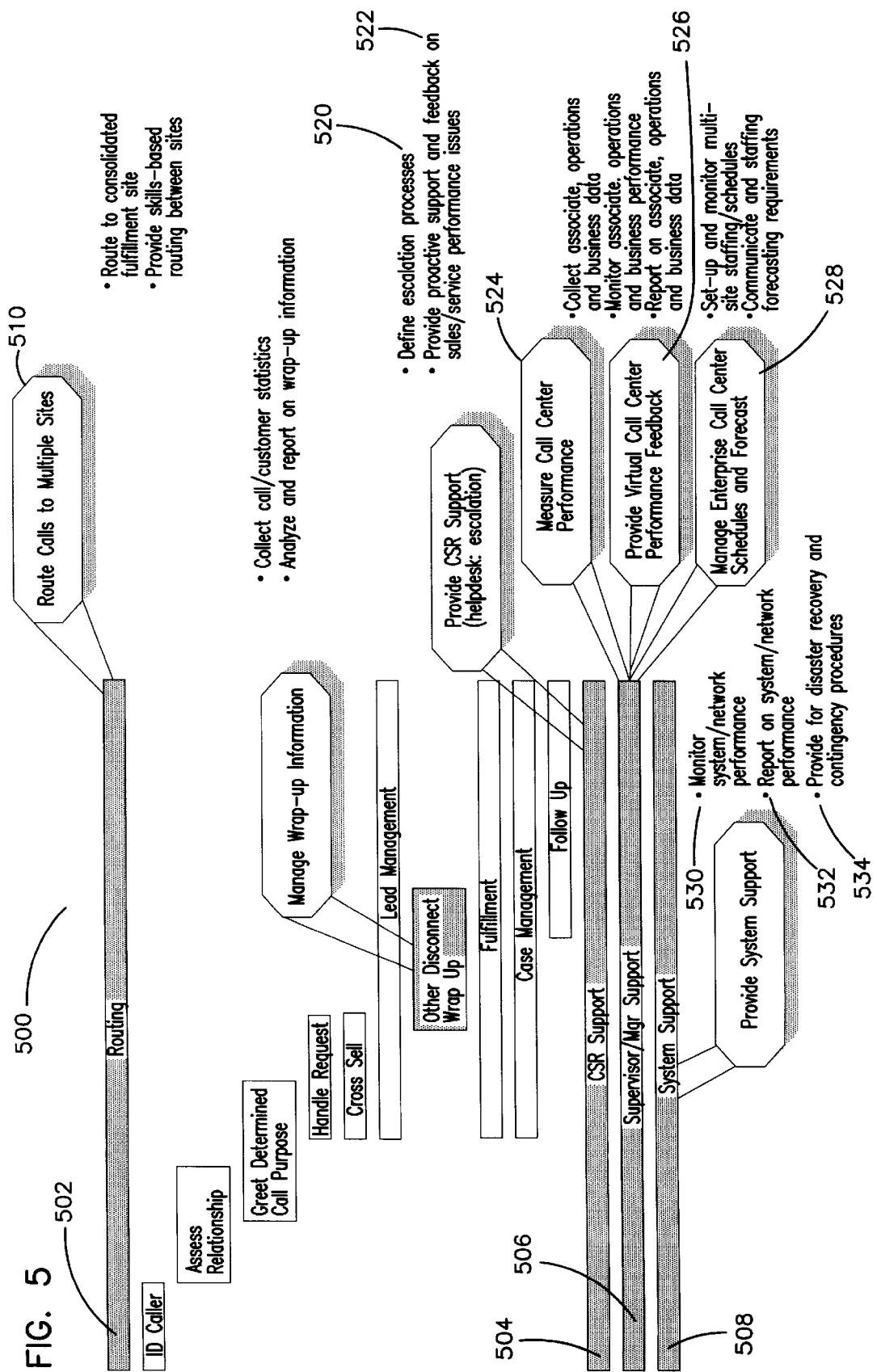
FIG. 5 is a outline of the business processes for operating and supporting a multi-site, Virtual Sales and Service Center.

FIG. 5 is an outline 500 of the business processes for operating and supporting a multi-site, Virtual Sales and Service Center.

The business processes 500 illustrated in FIG. 5 include routing 502, customer service support 504, supervisor/management support 506 and system support 508. The routing processes 502 are supervised and modified as necessary by the Quality Center. For example, the Quality Center may adjust the routing rules in cases of inclement weather forcing the shutdown of a particular location by routing calls to multiple sites 510.

The Quality Center will provide customer service support 504 by defining escalation processes 520 and providing proactive support and feedback on sales/service performance issues 522. The Quality Center will also measure the performance of the Virtual Sales and Service Center 524, provide performance feedback 526 and manage the staffing, schedule and forecasting 528 for the Virtual Sales and Service Center 300. System support 508 will be provided by the Quality Center in the form of monitoring of 530 and reporting on 532 the system performance, and providing disaster recover and contingency procedures 534.

According to the present invention, the routing rules are the step-by-step instructions which combine the routing components to identify what resource will receive a particular contact. Skills based routing methodology uses the skills and experience of each resource. The skills and experience of each resource is then matched against the requirements and characteristics of a particular contact to assign any type of sales and service resource to the contact. Contacts can be assigned to any resource that has the skills required for the contact. Similarly, overflow can be to any resource with the required skills. Intelligent rule based routing according to the present invention provides several advantages to a Virtual Sales and Service Center. First, rule based routing reduces customer confusion with few/one access numbers for all of a company's products. Service is improved by getting the customer to the right resource the first time thereby reducing transfers. Rule based routing provides distinctive service levels based on a customers relationship.

Further, rule based routing can capitalize on "moment in time" relationship expansion opportunities by routing identified calls to skilled cross-sell and sales employees and can route callers to appropriate specialized employees based on callers request.

The efficiency of all sales and service resources is improved by balancing contacts across the enterprise resource pool and management of these resources may be more automated through routing rules designed to automatically handle overflow situations. This means that fewer resources, particularly expensive human resources, are required to handle peak contact volumes while maintaining the desired customer experience.

In addition, rule based routing allows positioning for mass customization of contacts based on customer indicated preferences.

To remain competitive, businesses must retain their most profitable customers and pro-actively increase customer profitability. According to the present invention, implement this strategy by segmenting customers and allocating resource levels to each to so as to deliver the desired customer experience. For example, calls from the most profitable customers would be answered by a business's most skilled and experienced employees while calls from the least profitable customers can be answered by the least experienced and skilled employees.

Many contacts into the Customer Service Center also offer unique cross-sale opportunities. For example, if a customer is calling to pay off a loan, then the customer may be interested in a new loan. If the customer has only a checking account, then the customer may be a candidate for other services. Customers should be routed to specially trained cross-sale specialists and/or customer interaction technology resources may be directed to issue cross sell messages to the customer when these unique cross-sale opportunities are identified.

To facilitate this objective, Voice Response Units (VRUs) are scripted to identify the type of service the customer desires prior to transferring the call to any type of sales and service resource. This information will then be used to route the customer to a sales and service resource with the appropriate skills for that service. Specific requests for employee extensions can also be provided via a script.

In prior systems, calls are often balanced between centers based on "expected" call arrival and staffing assumptions. However, the percentage of calls allocated to each call center must be manually adjusted when actual arrival rates do not match the "expected" arrival rates. According to the present invention, call routing is automatically balance calls between all locations because all employees in all locations are can be considered during any route request. Further, the present invention automatically routes calls to overflow employees when optimal employees are unavailable.

Businesses need to develop a "relationship" with each customer. However, relationships are best developed when a customer speaks with any type of sales and service resource who is familiar with the customer and his or her needs. Call routing according to the present invention contributes to building customer relationships by routing calls to employees who have previously dealt with the customer. Rule based routing provides the customer the ability to request a specific employee or in the absence of a specific employee request, route the customer to any type of sales and service resource with whom he or she has previously spoken. If that particular employee is not available the customer should be able to request a call back from the employee.

The rule based routing system also provides a framework where additional routing functionality can be easily developed for the Virtual Sales and Service Center. Intelligent routing technology assures that calls are routed to employees with the necessary skills to provide the highest quality of service to the calling customer. This technology utilizes information gathered from the customer profile and seeks to make an appropriate match to that of any type of sales and service resource's profile. Routing decisions are therefore not based on a single queue or gate (e.g. Service) but can be governed by which employee skills can most accurately address the caller's request. Once any type of sales and service resource has obtained a new skill or improved on an existing skill, it becomes a simple task of updating that employee's skills profile. Similarly, if additional customer information needs to be included in the routing decision, the customer profile is updated to include the routing criteria. Overflow rules are also automated to allow for increased call center management.

Accordingly, an intelligent rule based routing system according to the present invention can provide single 800 number access for all products and services; pre-routing between multiple call centers based on availability of particular employee skill sets; skills based routing via employee and customer profile matching; call overflow management based on automated rules and pre-programmed next best routes; improved call management by reduced points of control; service level distinction based on customer value profile once customer is identified; and mass customization of routing based on detailed employee and customer profiles.

Figure 6:
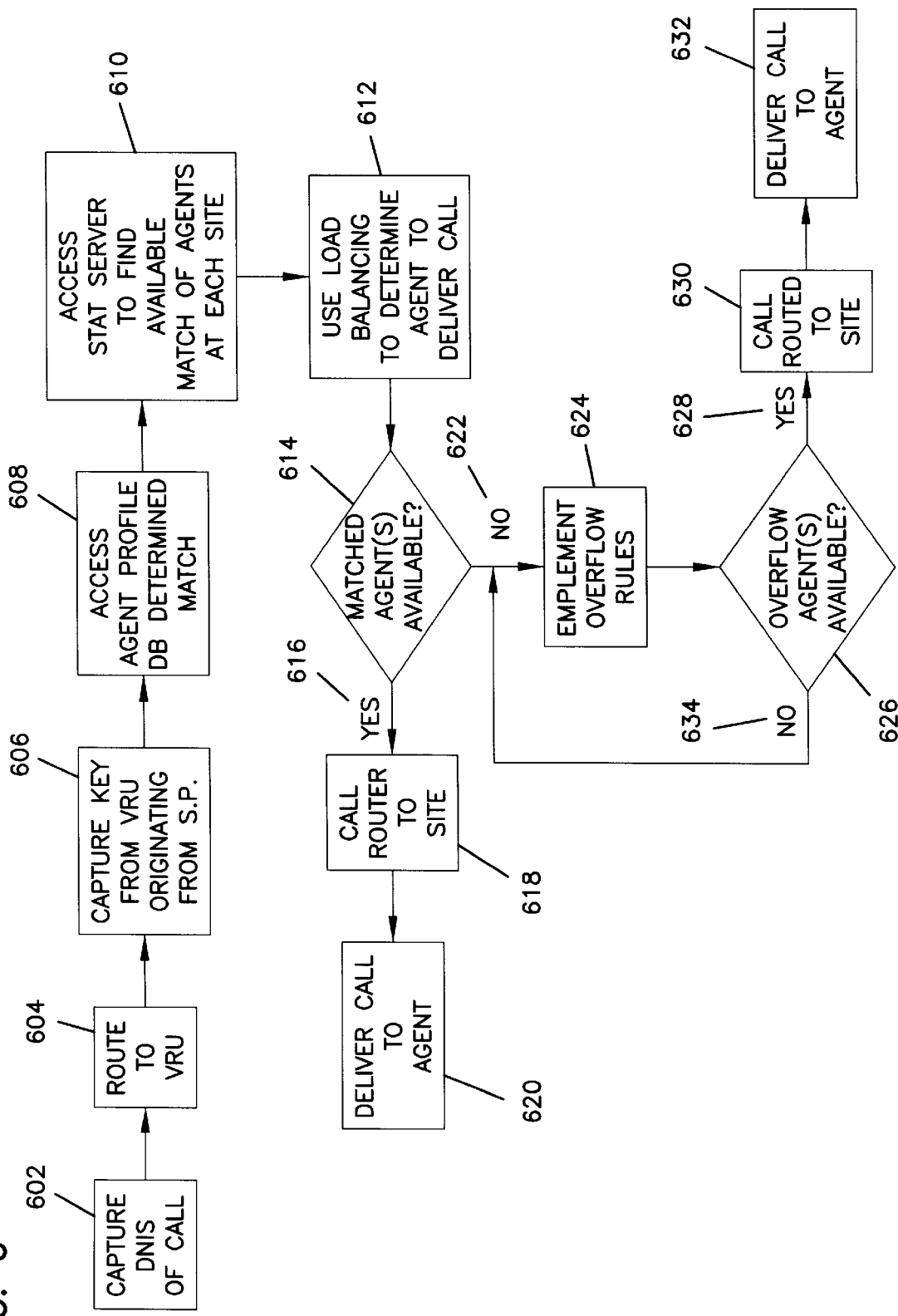
FIG. 6 illustrates a flow chart of a routing decision according to the present invention.

FIG. 6 illustrates a flow chart 600 of a customer phone call routing decision according to the present invention. A call is received and is then routed to a VRU 604. Customer profiles, the DNIS of the call, customer accounts and traditional account data is accessed by the VRU and customer initiated VRU events, which are then passed to the Service Provider 606 via the context manager. The Service Provider applies decision logic to determine the customer needs resulting in a routing profile 608. Next, a statistics server is accessed to find available match of employees meeting the sales and service resource profile for the routing profile 610. Employee level load balancing is applied to the routing decision if more than one employee in the qualified pool is available 612. If an optimal employee is available 616, then the call is routed to the site of the employee 618 and the call is delivered to the employee 620. If an optimal employee is unavailable 622, then overflow rules are implemented 624. The routing engine then determines if the an overflow employee is available 626. If an overflow employee is available 628, then the call is routed to the site 620 and then delivered to the overflow employee 622. If the overflow employee is not available 624, then the caller waits for a predetermined period of time 626 before the skill profile requirements are further relaxed. This logic continues until the skill requirements are relaxed to the maximum extent possible or an employee is selected.

Figure 7:
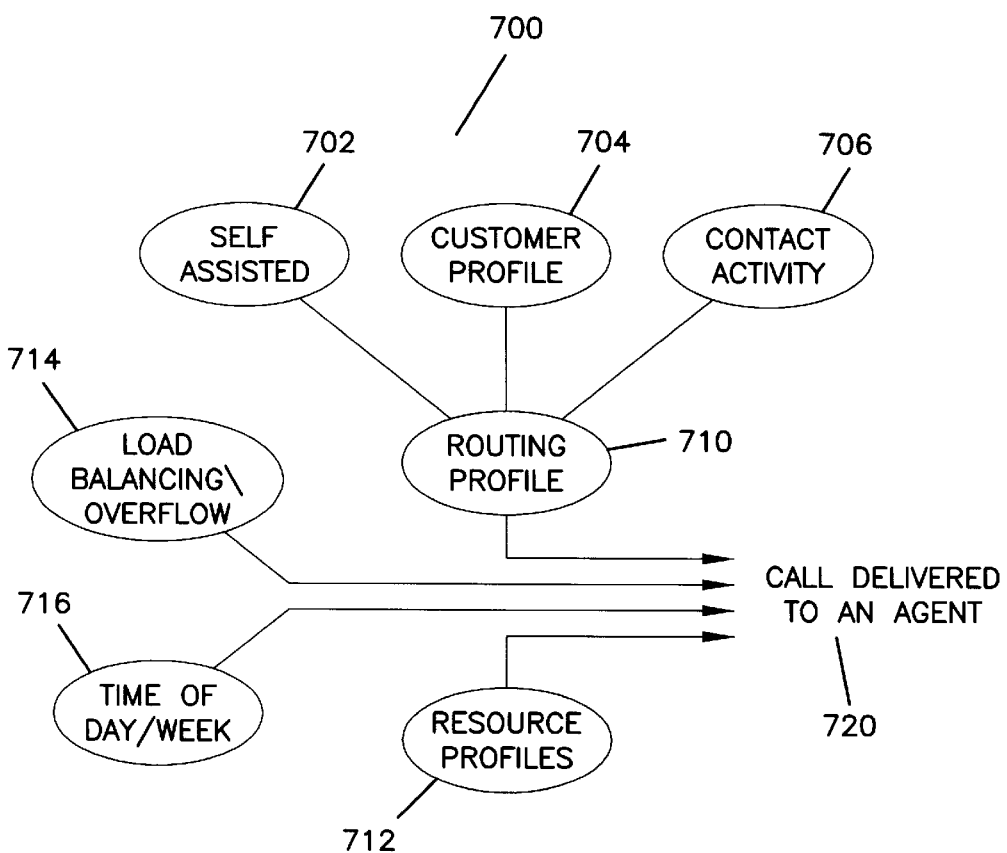
FIG. 7 illustrates a flow diagram for developing a contact routing profile for making any type of sales and service resource match.

FIG. 7 illustrates a flow diagram 700 for developing a routing profile for making any type of sales and service resource match. The routing is made up of a combination of the requested interaction style (self, assisted) 702, customer attributes 704, and contact activity thus far 706. These factors are combined and used to determine a contact profile 710. This profile 710 is then matched against the set of resource profiles 712 with load balancing/overflow conditions 714 and time of day 716 to determine the appropriate sales and service resource to receive the contact 720. The ideal routing decision has an exact match of a routing profile with an available resource profile.

Routing rule processing can handle many types of customer access methods including phone calls, mail, e-mail, fax, preformatted data messages, etc. Often the highest volume and most complex routing rules are associated with phone calls requiring employee assistance. Routing such calls is extremely challenging due to the potential for thousands of employees in thousands of locations, the potential that these employees have widely varying skills and the need to make a routing decision very quickly in order to meet the customers expectations. As a result, the remaining diagrams focus primarily on dealing with such phone calls. However, the same routing rules apply to the other access methods and resources, including employees, may routinely receive contacts employing a variety of access methods.

These detailed elements and attributes determine the route of a call. DNIS is a unique value assigned to the number dialed by the customer. FIG. 8 illustrates services 800 for a banking environment which can be assigned to a DNIS. For example, this information can be used to identify the unique services 802, 804 of a banking environment. The DNIS can be used to identify the language of the caller 806, and whether a Telecommunications Device for the Deaf (TDD) is required 808. Local numbers can be used for general customer service 810.

Day/Time dependent routing strategies can also be implemented. One routing strategy can apply for peak hours of business days. Another strategy can apply during off peak hours or non-business days. This time distinction can be checked before the Call Router attempts to match the customer routing profile with the employee's profiles in order to minimize the decision process. FIG. 9 illustrates one example of a table of times for day/time dependent routing 900. The peak routing rules 902 provide for full routing during weekdays between 6:00 a.m. and 10:00 p.m. 904. Calls are routed from the VRU to the most appropriate CSR on Saturday from 6:00 a.m. to 6:00 p.m. 906. The off-peak routing rules 912 are determined based on a combination of overflow groups with zero hold times. Simplified off peak routing rules 912 will apply to route calls form the VRU to the most appropriate CSR on weeknights from 10:01 p.m. to 5:59 a.m. 914, Saturdays from 6:01 p.m. to 5:59 a.m. 916 and Sunday and holidays from 6:00 a.m. to 5:59 a.m. 918.

Figure 10:
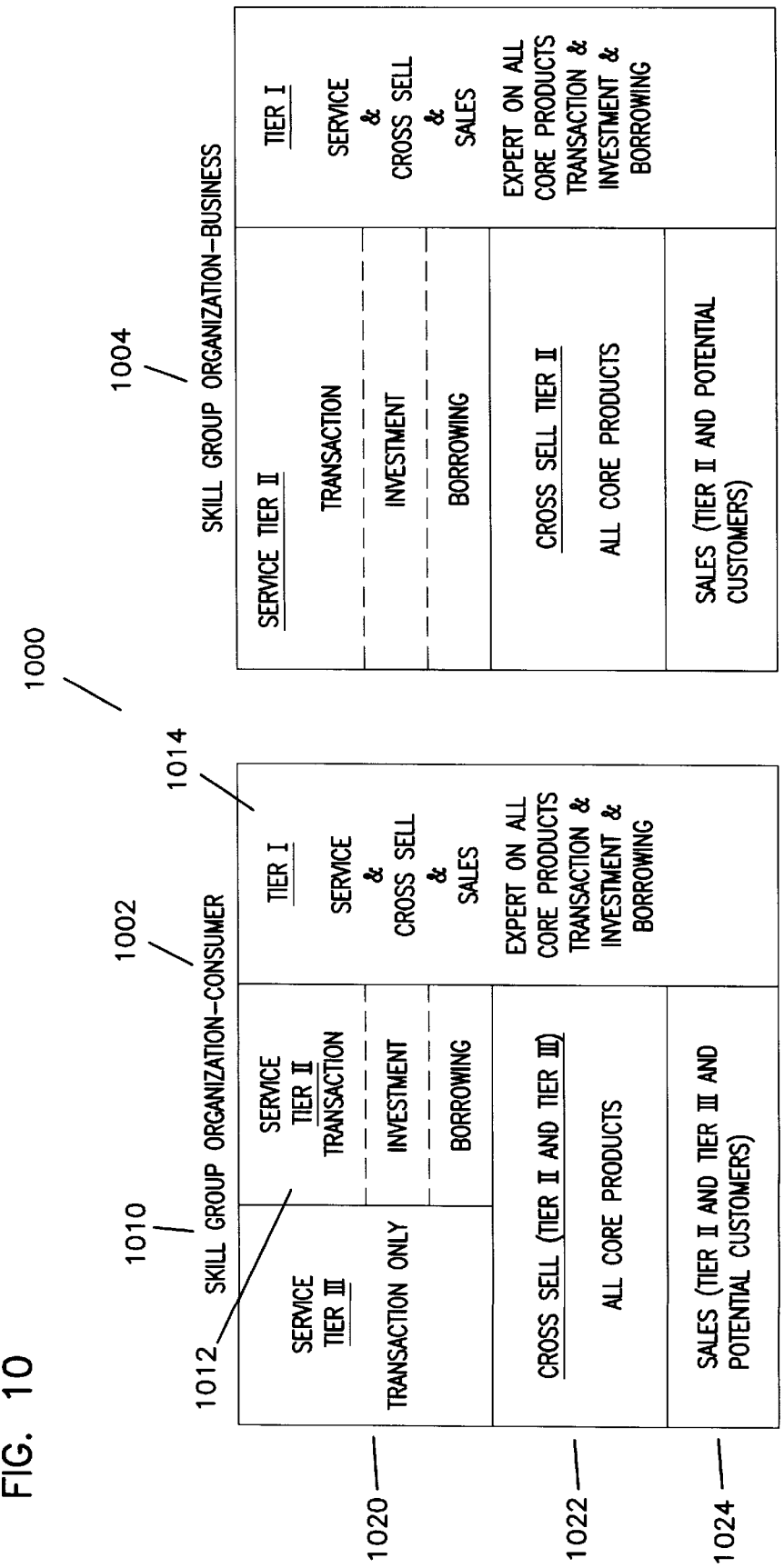
FIG. 10 illustrates an embodiment of call center organizational charts for consumer and business customers.
Figure 11:
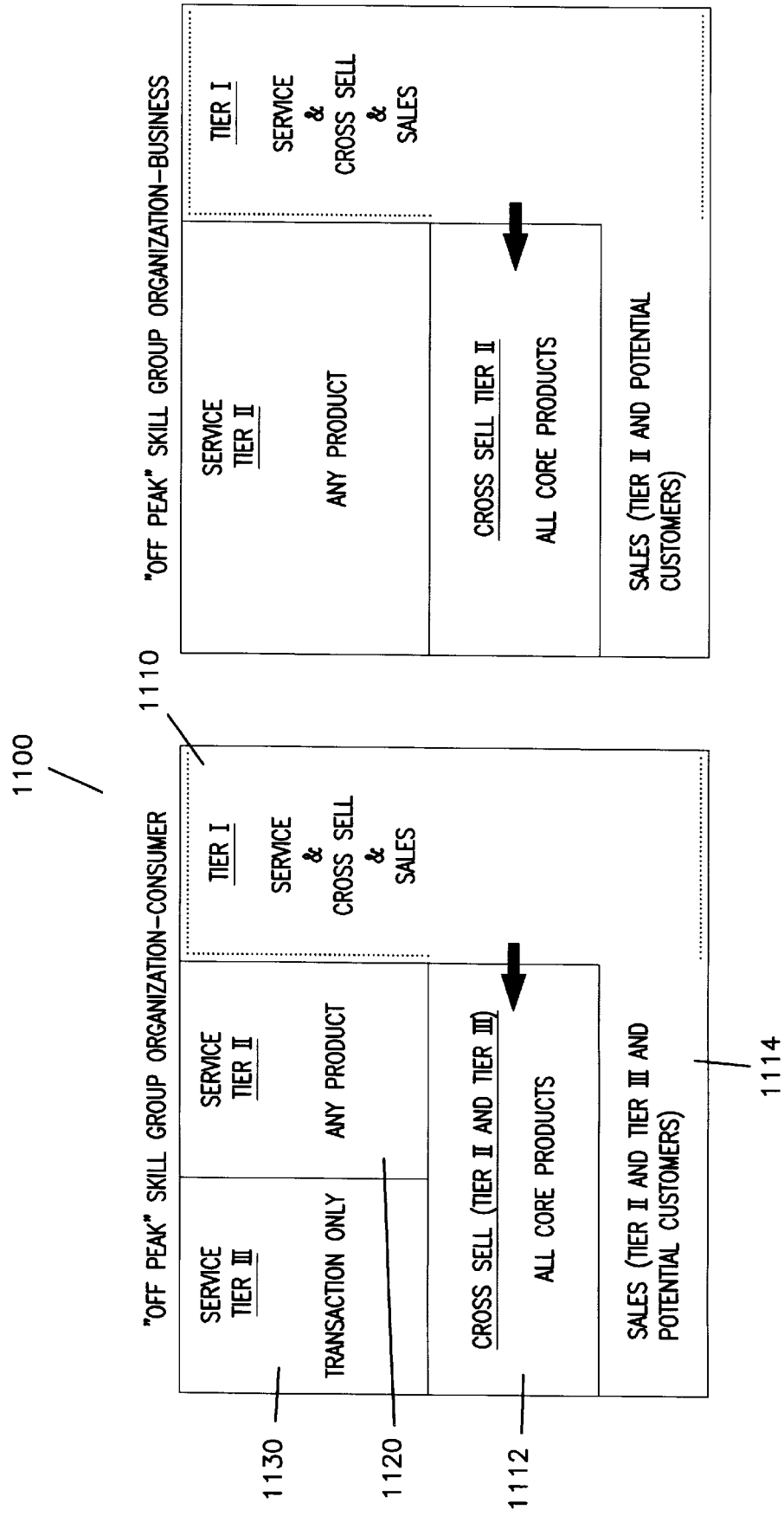
FIG. 11 illustrates the changes that may be made to the call center organizational charts as a result of setting the overflow times to zero for off peak times.

Routing changes may occur as a result of setting the overflow times to zero. FIG. 10 illustrates an embodiment of skill group organizational charts 1000 for consumer 1002 and business 1004 customers in a banking environment. The skill group organizational charts 1000 are broken down into three tiers 1010, 1012, 1014. The organizational charts apply to the three types of products: service 1020, cross-sales 1022, and sales 1024. FIG. 11 illustrates the changes 1100 that may be made to the skill group organizational charts as a result of setting the overflow times to zero for off peak times.

For example, for Tier I Service, Cross-Sell, and Sales, group 1110 may be increased with the addition of the Cross-Sell for the Tier II and Tier III group 1112. The sales group for Tier II, Tier III and potential customers 1114 can be increased with the addition of the Cross-Sell for the Tier II and Tier III group 1112. The Cross-Sell group for Tier II and Tier III 1112 can be increased with the addition of the Tier I Service, Cross-Sell, and Sales 1110. The Tier II Service group 1120 may be selected to have no distinction based on the product, while Tier III services 1120 is for transactions only.

Based on a customer entering a customer ID, detailed customer information can be collected. For example, the customer ID may be used to identify the customer tier, cross-sell indicator, customer type and product type. If no customer ID is collected during the call, the call can be treated according to a default mode. For example, the default mode could be set so that a call is treated as a Tier II consumer customer requesting service for any product.

VRU scripts can be used to identify unique services and cross-sell opportunities for customers. For example, the last event a customer completes in the VRU may result in the call being routed to a specific Request Type, Product or transferred to a center of expertise (determined by the Service Provider.

FIG. 12 illustrates a table 1200 defining the Request Type 1202, Product or Transfer 1204 which corresponds to various possible exit points from a VRU 1206. These routing elements 1202, 1204, 1206 may be used to make up a Call Routing Profile. This Call Routing Profile will be defined by the Service Provider and will indicate the skill set which will best fit the call for routing purposes.

FIG. 13 illustrates a table 1300 of the elements 1302, values 1304 and method of determination 1306 for the call profile. If a caller does not identify himself/herself in the VRU 1310, the call is routed as a Tier II Consumer Service 1312. The call profile that results from number dialed, customer profile, and VRU activity will be matched against the set of employee profiles depending on peak and off-peak time periods.

FIG. 14 illustrates a table 1400 for the employee profiles. Any type of sales and service resource profile includes the type of customer which any type of sales and service resource can serve 1402, the service skills of the employee 1404, the language spoken by the employee 1406, whether the employee is a supervisor 1408, an indication of what customer segment any type of sales and service resource services 1410, the product skill level 1412 and employee extensions 1414. Any type of sales and service resource profile is maintained for each employee to identify his or her specific skills and experience. This profile is used to route each call to the employee with the right skills for that call and customer. A primary and secondary profile will be available for each employee. Employees with a secondary profile can receive calls based on this profile when there are no calls which match their primary profile. The resulting route will also take into consideration the resource level Load Balancing Characteristics which are in effect across the company.

FIG. 15 illustrates the Load Balancing Characteristics 1500. Calls can be distributed to employees based on several load balancing characteristics. For load balancing 1502, calls can be routed to the employee within any type of sales and service resource skill group who has been available for the longest amount of time 1504. Overflow rules 1506 can be used to route calls to other employees when exact match of call routing profile and employee profile is unavailable 1508. Overflow conditions can be implemented after an appropriate wait time has expired. Priority routing 1510 for calls which are waiting for an available group of employees can be prioritized according to the customer value 1512, employee transfer 1514 or overflow conditions 1516. Prioritization according to customer value 1512 allows Tier I calls to be treated first. Prioritization according to employee transfer 1514 allows customers that have been transferred by any type of sales and service resource to be given a higher priority. Finally, priority can be based upon overflow conditions 1516. Also, multiple employee profiles 1518 may be used for additional layer effectively 1520.

Overflow rules will be implemented when an exact match between the call routing profile and the employee profile is unavailable per the above routing scheme. FIG. 16 is a chart 1600 illustrating implementation of overflow rules. In FIG. 16, Tier I customers 1602 wait for twenty seconds 1604 and then a cross-sell opportunity is presented to the customer 1606. For Tier II product or service customer 1608, a forty-five second wait time 1610 is implemented before the caller is transferred to all Tier II product and service employees 1612. All original cross-sell destinations 1614 receive a sixty second wait period 1616 before being transferred to Tier I employees 1618. Tier III transaction and service calls 1620 are put on hold 1622 until a Tier III service employee can take the call 1624. Tier II or III sales calls 1636 receive a sixty second wait time 1628 before being transferred to a cross-sell employee 1630. If the call has not been answered for any of the above overflow conditions 1632 then the call is routed to any available employee 1636 after a ten minute wait period 1634. Those skilled in the art will recognize that the specified times and overflow rules could be modified to accommodate other business goals.

Figure 17:
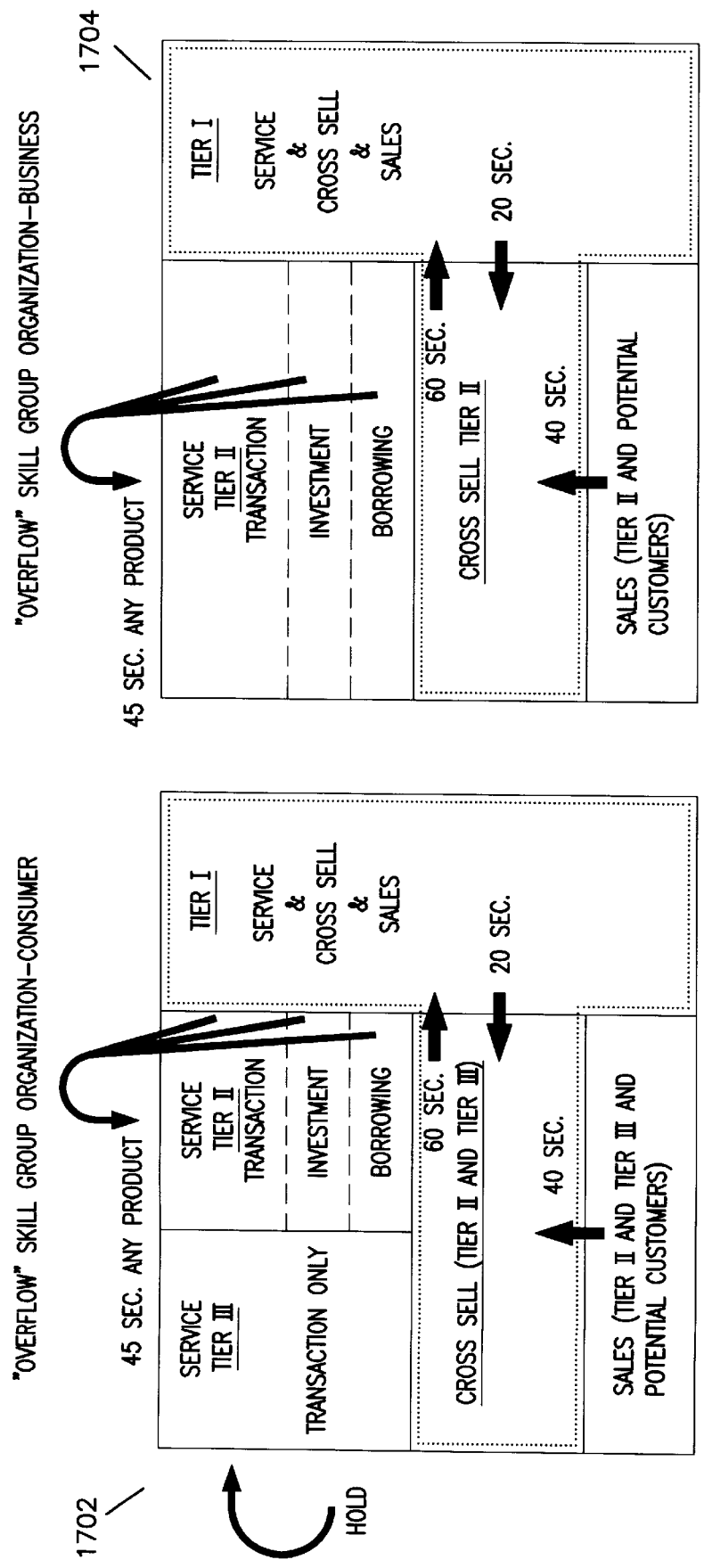
FIG. 17 illustrates consumer and business organizational diagrams showing the operation of the overflow conditions.

FIG. 17 illustrates consumer 1702 and business 1704 organizational diagrams showing the operation of the overflow conditions.

Figure 18:
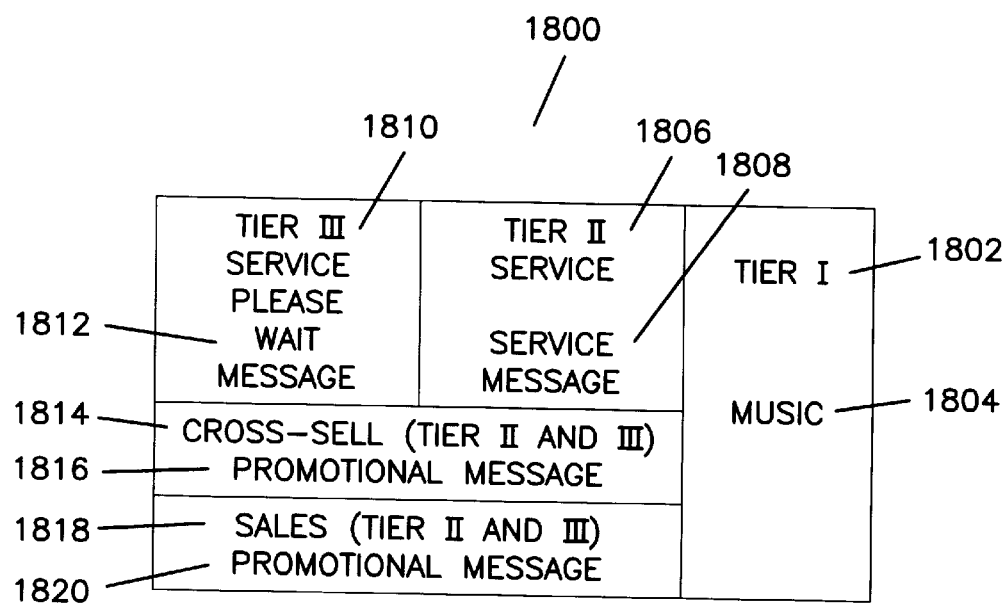
FIG. 18 illustrates a call treatment chart identifying what a caller on hold will hear.

When customers are required to wait for available employees, a variable call treatment scheme can be used. FIG. 18 illustrates a call treatment chart 1800 identifying what a caller on hold will hear. For example, a Tier I caller 1802 will hear music 1804, while a Tier II customer 1806 may hear a service message 1808 and a Tier III customer 1810 hears a "please wait" message 1812. Cross-sell customers 1814 will hear one promotional message 1816, while a sales customer 1818 may hear another promotional message 1820.

FIG. 19 is a chart 1900 used in implementing the rule based routing according to the present invention. In FIG. 19, twenty-four scenarios 1902 are presented. The chart is divided into four segments: a customer type 1910, a primary employee type 1920, a first overflow employee 1950 and a second overflow employee 1970. The customer type is further divided into language type 1912, type of customer 1914, segment type 1916, request type 1918 and product type 1920. The primary employee type 1920, first overflow employee type 1950 and second overflow employee type 1970 include the same divisions. A first call wait time 1980 separates the primary employee type 1930 and the first overflow employee type 1950. An additional call wait time 1982 separates the first overflow employee type 1950 and the second overflow employee type 1970.

For the first scenario 1904, an English speaking consumer Tier I customer calls. This type of customer is not broken down into the request 1918 or product type 1920. The customer for the first scenario is matched with any type of sales and service resource 1920 having the same attributes. If any type of sales and service resource of this type is unavailable, the customer is put on hold for twenty seconds 1980. After twenty seconds 1980, the call rolls over to the overflow mode where an English speaking Tier II or III consumer cross-sell employee 1950 processes the calls. If this type of employee is unavailable, the customer is put on hold for the remaining predetermined duration, i.e., ten minutes less the twenty seconds for the first scenario 1982. Then the first available English speaking employee processes the call 1970. Those skilled in the art will readily recognize that these routing rules may be modified to accommodate any business goals or objectives, including peak and off-peak deliveries and error situations where CTI is not available.

In summary, the rule based routing system interfaces the customer with the right resource to fulfill the customer's needs in a fast and easy manner. Different levels of service are provided by the Virtual Sales and Service Center depending on the nature of the present and potential customer relationship. The seamless integration of sales and service improves revenue opportunities, while ensuring a consistently positive customer experience.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A rule based routing engine for routing a customer to any type of sales and service resource, comprising:

a customer profile database for storing a plurality of customer types;

a sales and service resource profile data base for storing a plurality of primary resource types, first overflow resource types and second overflow resource types;

a receiver for receiving customer data from an access resource handling a customer contact; and a processor for determining a customer type based upon the customer data, identifying a matching primary resource within the sales and service resource profile data base that is best suited to handle the call, and routing the customer to the matching primary resource;

wherein the customer profile database is updated with the matching primary resource identified for handling the call in order to provide additional information to the processor when identifying a matching primary resource during subsequent calls.

2. The rule based routing engine of claim 1 wherein the customer types comprise an identification of customer subfields, wherein the subfields comprise a language, a type of customer, a segment, a request type, opportunity type and a product.

3. The rule based routing engine of claim 2 wherein the segment comprises a grouping of like customers based on an analysis of the available subfields.

4. The rule, based routing engine of claim 2 wherein the request type comprises a service or sales request.

5. The rule based routing engine of claim 2 wherein the opportunity type comprises a cross-sell opportunity.

6. The rule based routing engine of claim 1, wherein the processor identifies a first overflow resource and a second overflow resource for routing the customer when the identified primary resource is unavailable.

7. The rule based routing engine of claim 1, further comprising a timing device for placing the customer on hold for a first predetermined period of time when the matching primary resource is unavailable.

8. The rule based routing engine of claim 7, wherein the processor identifies a first overflow resource for routing the customer to when the matching primary resource is unavailable.

9. The rule based routing engine of claim 8, wherein the processor routes the customer to the first overflow resource when the first predetermined period of time has expired.

10. The rule based routing engine of claim 9 wherein the timing device placing the customer on hold for a second predetermined period of time when the first overflow resource is unavailable.

11. The rule based routing engine of claim 10 wherein the processor identifies a second overflow resource for routing the customer to when the identified first overflow resource is unavailable.

12. The rule based routing engine of claim 11 wherein the processor routes the customer to the second overflow resource when the second predetermined period of time has expired.

13. A routing system for developing a routing profile for making a sales and service resource match to a customer during a call, comprising:

a call profile processor for identifying a call profile for the call;

a match processor for matching the call profile to a sales and service resource profile representing an identified resource and generating an instruction signal;

customer interaction devices capable of receiving an instruction signal and accepting data from the customer during the call; and a switch for receiving the instruction signal and routing the call to the identified resource in response thereto;

wherein the call profile processor updates the call profile identified for the call with the routing profile for use in subsequent contacts with the customer; and the routing profile comprises the identified resource and instruction signal used in routing the call.

14. The routing system of claim 13 further comprising a individual resource level load balancer for monitoring for overflow or overload conditions and applying load balancing and overflow rules to the call in response to detection of overflow or overload conditions.

15. The routing system of claim 13 wherein the call profile processor comprises a number identification system for identifying a number from which a customer place the call and for identifying the number called by the customer, a customer profile database for storing customer attributes, and a VRU interface for receiving VRU activity, wherein the call profile is based upon the number from which the customer placed the call, the number dialed by the customer, the customer attributes and the received VRU activity.

16. A method of routing customer contacts, comprising the steps of:

storing a plurality of customer types in a customer profile database;

storing a plurality of primary resource types, first overflow resource types and second overflow resource types in a sales and service resource profile data base;

receiving customer data from a device handling a customer contact;

determining a customer type based upon the customer data by identifying customer subfields;

identifying a matching primary resource within the sales and service resource profile data base to handle the call for routing the customer to the matching primary resource; and routing the customer to the matching primary resource, and updating the customer profile database identified for the call with the matching primary resource for use in identifying the matching primary resource during subsequent contacts with the customer.

17. The method of claim 16 wherein the step of determining a customer type further comprises the step of identifying customer subfields, wherein the subfields comprise a language, a type of customer, a segment, a request type, an opportunity type and a product associated with the customer.

18. The method of claim 17, wherein the step of identifying the customer subfields further comprises the step of analyzing relevant customer subfields.

19. The method of claim 17 wherein the step of identifying the request type further comprises the step of confirming the request type is a service request.

20. The method of claim 17 wherein the step of identifying the request type further comprises the step of confirming the opportunity type is a cross-sell opportunity.

21. The method of claim 16 further comprising the step of identifying a first overflow resource and a second overflow resource for routing the customer to when the identified primary resource is unavailable.

22. The method of claim 16 further comprising the step of placing the customer on hold for a first predetermined period of time when the identified resource is unavailable.

23. The method of claim 22 further comprising the step of identifying a first overflow resource for routing the customer to when the identified primary resource is unavailable.

24. The method of claim 23 further comprising the step of routing the customer to the first overflow resource when the predetermined period of time has expired.

25. The method of claim 24 further comprising the step of placing the customer on hold for a second predetermined period of time when the first overflow resource is unavailable.

26. The method of claim 25 further comprising the step of identifying a second overflow employee for routing the customer to when the identified first overflow resource is unavailable.

27. The method of claim 26 further comprising the step of routing the customer to the second overflow resource when the second predetermined period of time has expired.

28. A method for developing a routing profile for making a sales and service resource match to a customer during a call, comprising:

identifying a call profile for the call;

matching the call profile to a sales and service resource profile representing an identified resource in a call center;

generating an instruction signal;

routing the call to the identified resource in response to the instruction signal; and updating the call profile identified for the call with the routing profile for use in matching the call profile to the sales and service resource profile during subsequent contacts with the customer;

wherein the routing profile comprises the identified resource and instruction signal used in routing the call.

29. The method of claim 28 further comprising the steps of monitoring the virtual sales and service center for overflow or overload conditions and applying resource level load balancing and overflow rules to the call in response to detection of overflow or overload conditions.

30. The method of claim 28 wherein the step of identifying the call profile further comprises the steps of identifying a number from which a customer place the call, identifying the number called by the customer, storing customer attributes in a customer profile database, and receiving VRU activity.

* * * * *